(12) United States Patent
Alexander et al.

(10) Patent No.: US 10,897,850 B2
(45) Date of Patent: Jan. 26, 2021

(54) SYSTEM AND METHOD FOR AUTOMATING TRANSFER OF PLANTS WITHIN AN AGRICULTURAL FACILITY

(71) Applicant: Iron Ox, Inc., San Francisco, CA (US)

(72) Inventors: Brandon Ace Alexander, San Francisco, CA (US); Jonathan Binney, San Carlos, CA (US)

(73) Assignee: Iron Ox, Inc., San Francisco, CA (US)

( * ) Notice: Subject to any disclaimer, the term of this patent is extended or adjusted under 35 U.S.C. 154(b) by 0 days.

(21) Appl. No.: 16/701,037

(22) Filed: Dec. 2, 2019

(65) Prior Publication Data
US 2020/0187425 A1 Jun. 18, 2020

Related U.S. Application Data

(63) Continuation of application No. 16/456,401, filed on Jun. 28, 2019, now Pat. No. 10,524,425, which is a (Continued)

(51) Int. Cl.
| | |
|---|---|
| *G06F 7/00* | (2006.01) |
| *A01G 7/00* | (2006.01) |
| *B25J 11/00* | (2006.01) |
| *A01G 9/14* | (2006.01) |
| *A01G 9/029* | (2018.01) |
| *A01G 9/02* | (2018.01) |
| *B25J 9/16* | (2006.01) |
| *G05D 1/02* | (2020.01) |

(Continued)

(52) U.S. Cl.
CPC ............ *A01G 7/00* (2013.01); *A01G 9/02* (2013.01); *A01G 9/0299* (2018.02); *A01G 9/143* (2013.01); *B25J 9/1679* (2013.01); *B25J 9/1697* (2013.01); *B25J 11/00* (2013.01); *G05D 1/0287* (2013.01); *A01B 69/008* (2013.01); *G05D 2201/0216* (2013.01); *G06K 9/58* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 10,375,898 B2 * | 8/2019 | Alexander | A01G 9/143 |
| 2018/0295783 A1 * | 10/2018 | Alexander | G06T 7/0016 |
| 2019/0000019 A1 * | 1/2019 | Alexander | B25J 11/00 |

* cited by examiner

*Primary Examiner* — Yolanda R Cumbess
(74) *Attorney, Agent, or Firm* — Run8 Patent Group, LLC; Peter Miller

(57) ABSTRACT

One variation of a method for automating transfer of plants within an agricultural facility includes: dispatching a loader to autonomously deliver a first module—defining a first array of plant slots at a first density and loaded with a first set of plants at a first growth stage—from a first grow location within an agricultural facility to a transfer station within the agricultural facility; dispatching the loader to autonomously deliver a second module—defining a second array of plant slots at a second density less than the first density and empty of plants—to the transfer station; recording a module-level optical scan of the first module; extracting a viability parameter of the first set of plants from features detected in the module-level optical scan; and if the viability parameter falls outside of a target viability range, rejecting transfer of the first set of plants from the first module.

1 Claim, 4 Drawing Sheets

Related U.S. Application Data continuation of application No. 16/260,042, filed on Jan. 28, 2019, now Pat. No. 10,375,898, which is a continuation of application No. 15/852,749, filed on Dec. 22, 2017, now Pat. No. 10,225,993.

(60) Provisional application No. 62/437,822, filed on Dec. 22, 2016.

(51) Int. Cl.
*A01B 69/04* (2006.01)
*G06K 9/58* (2006.01)

SYSTEM AND METHOD FOR AUTOMATING TRANSFER OF PLANTS WITHIN AN AGRICULTURAL FACILITY

CROSS-REFERENCE TO RELATED APPLICATIONS

This Application is a continuation of U.S. patent application Ser. No. 16/456,401, filed on 28 Jun. 2019, which is a continuation of U.S. patent application Ser. No. 16/260,042, filed on 28 Jan. 2019, which is a continuation of U.S. patent application Ser. No. 15/852,749, filed on 22 Dec. 2017, which claims the benefit of U.S. Provisional Application No. 62/437,822, filed on 22 Dec. 2016, each of which is incorporated in its entirety by this reference.

TECHNICAL FIELD

This invention relates generally to the field of agricultural implements and more specifically to a new and useful method for automating transfer of plants within an agricultural facility in the field of agricultural implements.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
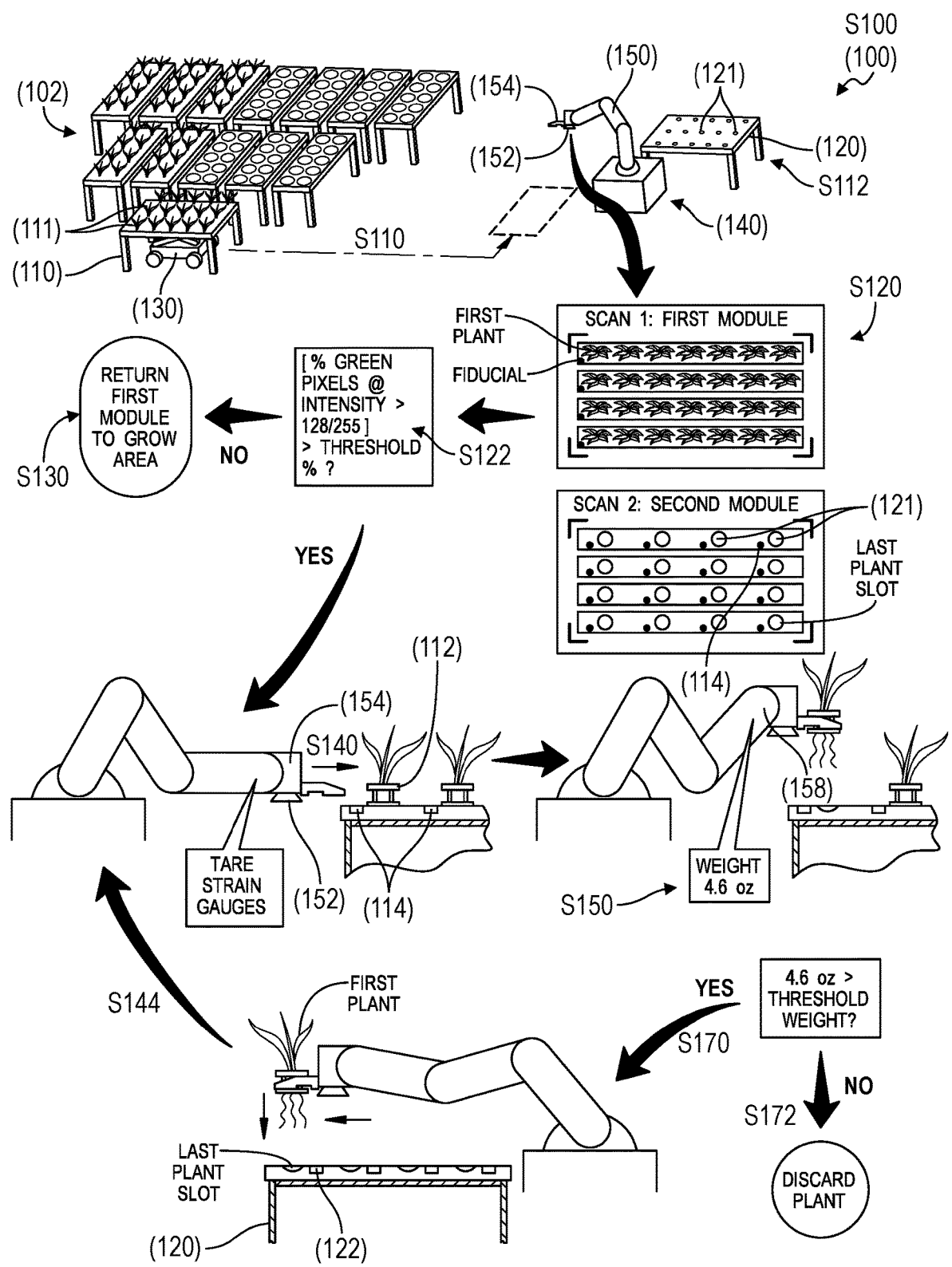
FIG. 1 is a flowchart representation of a method and a system.

As shown in FIG. 1, a method S100 for automating transfer of plants within an agricultural facility includes: dispatching a loader to autonomously deliver a first module from a first grow location within an agricultural facility to a transfer station within the agricultural facility in Block S110, wherein the first module defines a first array of plant slots at a first density and loaded with a first set of plants at a first growth stage; dispatching the loader to autonomously deliver a second module to the transfer station, wherein the second module defines a second array of plant slots at a second density less than the first density and empty of plants in Block S112; recording a module-level optical scan of the first module in Block S120; extracting a viability parameter of the first set of plants from features detected in the module-level optical scan in Block S122; and, in response to the viability parameter falling outside of a target viability range, rejecting transfer of the first set of plants from the first module in Block S130. The method S100 also includes, in response to the viability parameter falling within the target range: triggering a robotic manipulator at the transfer station to sequentially transfer a first subset of the first set of plants from the first module into the second array of plant slots in the second module in Block S140; dispatching the loader to autonomously deliver a third module to the transfer station, the third module defining a third array of plant slots at the second density in Block S113; and, in response to filling each plant slot in the second array of plant slots in the second module with the first subset of plants, triggering the robotic manipulator to sequentially transfer a second subset of the first set of plants from the first module into the third array of plant slots in the third module in Block S140.

Figure 2A:
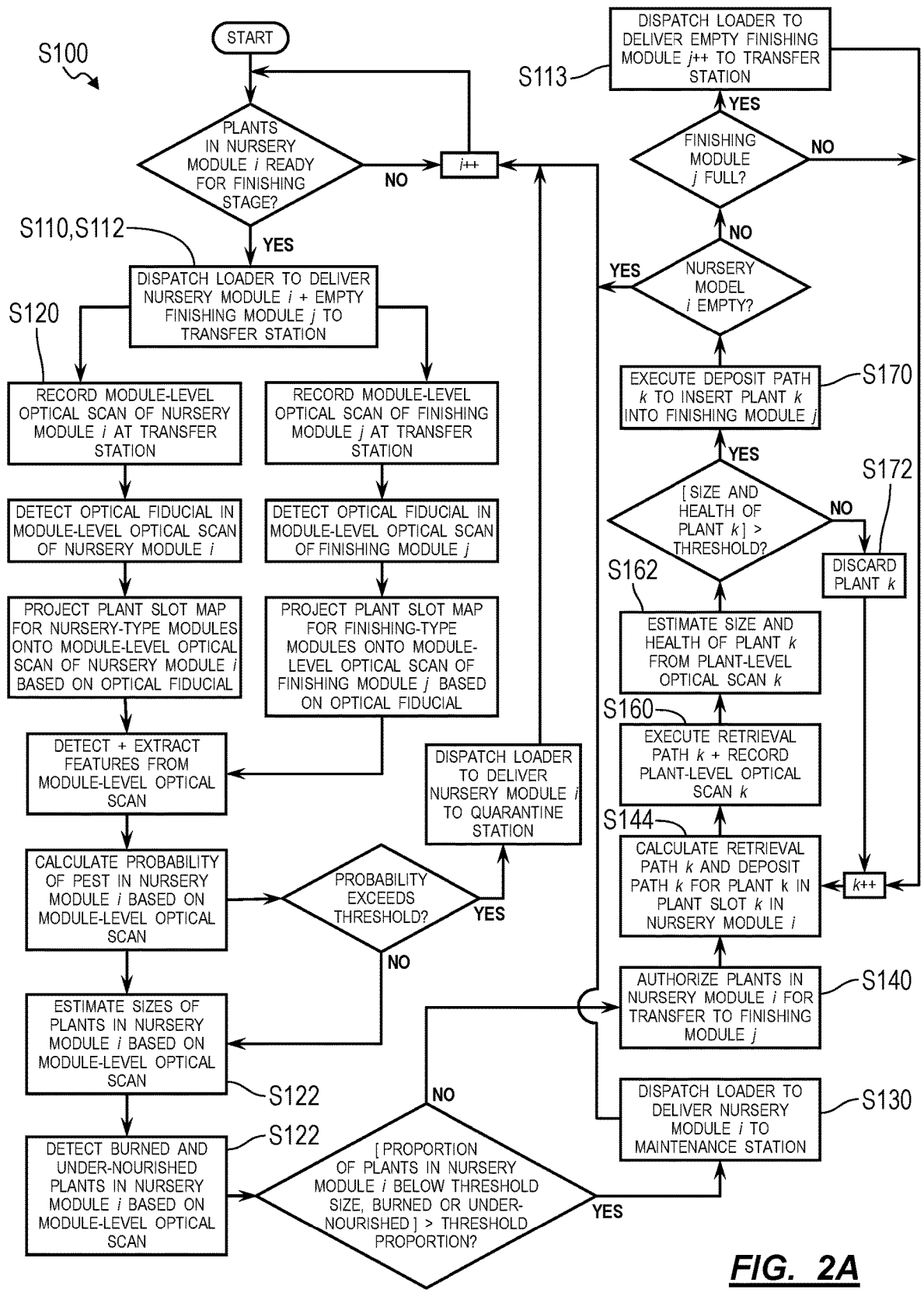
FIGS. 2A and 2B are flowchart representations of one variation of the method.
Figure 2B:
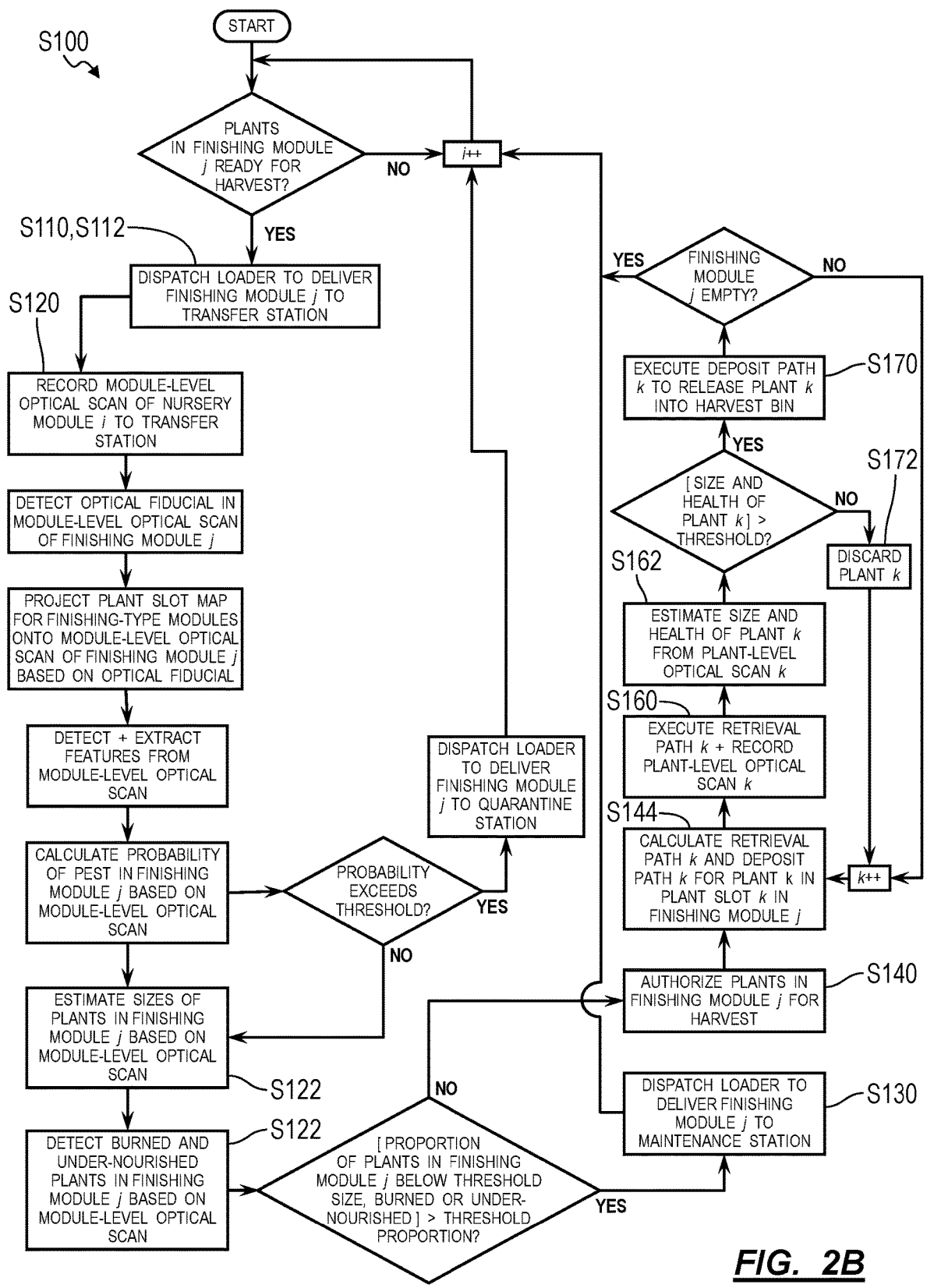

As shown in FIGS. 2A and 2B, one variation of the method S100 includes: dispatching a loader to autonomously deliver a first module from a first grow location within an agricultural facility to a transfer station within the agricultural facility in Block Silo, wherein the first module defines a first array of plant slots at a first density and loaded with a first set of plants at a first growth stage; dispatching the loader to autonomously deliver a second module to the transfer station in Block S112, wherein the second module defines a second array of plant slots at a second density less than the first density and empty of plants; at the transfer station, detecting a first optical fiducial on the first module, registering locations of the first array of plant slots in the first module at the transfer station based on the first optical fiducial, detecting a second optical fiducial on the second module, registering locations of the second array of plant slots in the second module at the transfer station based on the second optical fiducial, and navigating an end effector at the transfer station to engage a first plant, in the first set of plants, arranged in a first plant slot in the first array of plant slots in the first module in Block S140. This variation of the method S100 also includes: recording a first optical scan of the first plant in Block S160; extracting a first viability parameter of the first plant from the first optical scan in Block S162; in response to the first viability parameter exceeding a target value, transferring the first plant into a last plant slot in the second array of plant slots in the second module in Block S170; navigating the end effector to engage a second plant, in the first set of plants, arranged in a second plant slot in the first array of plant slots in the first module in Block S140, the second plant slot adjacent the first plant slot and exposed to the end effector by removal of the first plant; recording a second optical scan of the second plant in Block S160; extracting a second viability parameter of the second plant from the second optical scan in Block S162; and, in response to the target value exceeding the second viability parameter, withholding the second plant from the second module in Block S172.

Another variation of the method S100 includes: receiving a first module defining a first array of plant slots of a first density in Block Silo, the first array of plant slots loaded with a group of plants in a first growth stage; recording an optical scan of the first module in Block S120; extracting a viability parameter of plants in the group of plants from the optical scan in Block S122; and, in response to the viability parameter falling below a target value, rejecting the first module in Block S130. The method S100 also includes, in response to the viability parameter exceeding the target value: navigating an end effector at an end of a robotic manipulator laterally toward a first plant, in the group of plants, arranged in a first plant slot in the first array of plant slots in Block S140; navigating the end effector vertically from a first plant slot to extract the first plant from the first plant slot in Block S140; measuring a first weight of the first plant in Block S150; and, in response to the first weight of the first plant falling below a threshold weight, discarding the first plant in Block S172. The method S100 further includes, in response to the first weight of the first plant exceeding the threshold weight: navigating the end effector over a last plant slot in a second array of plant slots in a second module in Block S170, the second array of plant slots of a second density less than the first density; lowering the end effector toward the second module to insert the first plant into the last plant slot in the second array of plant slots in the second module in Block S170; and navigating the end effector laterally to a second plant in a second plant slot in the first array of plant slots, adjacent the first plant slot, in the first module.

2. Applications

Generally, Blocks of the method S100 can be executed or controlled by a controller 104 (or other computer system) in conjunction with a greenhouse or other agricultural facility (hereinafter the "facility") to automatically visually inspect plants in a first module configured to hold plants in a first density and to automatically transfer these plants into a second module configured to hold plants in a lower density—which may provide these plants greater access to light above, nutrients below, and room to grow outwardly than the first module—if these plants pass automated size and pest inspections. In particular, Blocks of the method S100 can be executed by a system, such as including: a local or remote controller 104, such as a remote server; a robotic manipulator connected to the controller 104, located at a transfer station within the facility, and outfitted with a camera, scale, and/or end effector configured to retrieve plants from modules; and/or an automated "loader" connected to the controller 104 and configured to retrieve modules from grow areas throughout the facility, to deliver modules to the transfer station, and to return modules to their assigned locations throughout the facility.

In particular, plants may be grown in modules arranged throughout the facility, wherein each module defines an array of plant slots configured to hold one plant (or a "bunch" of like plants, such as multiple basil plants) at a density suited to a stage of plant grown in the module. Young plants may have relatively small leaves covering a relatively small area such that these young plants require only a small grow volume; as these plants mature (e.g., to a "sprout" stage or through "thinning" and "rosette" stages), their leaves may grow to cover a greater area, thereby requiring a larger grow volume; as these plants mature further (e.g., through "early-heading," "mid-heading" and "mature-heading" stages), their leaves may develop more fully and thus cover a greater area up until a time that these plants are harvested, thereby necessitating an even larger grow volume. In order to maintain a relatively high throughput per floor area within the facility, the facility can be outfitted with modules of different types—that is, modules with different plant slot densities suited to various stages of plant growth and therefore to various size ranges of plants from seeding to harvest. For example, the facility can be outfitted with: seeding trays (or "seeding modules") defining a highest density of plant slots (e.g., 640 plant slots per 4-foot by 12-foot module) and configured to hold plants during a seeding stage; modules of a first type (hereafter a "nursery-type") defining a moderate density of plant slots (e.g., 170 plant slots per 4-foot by 12-foot module) and configured to hold plants during a sprout stage; and modules of a second type (hereinafter a "finishing-type") defining a lowest density of plant slots (e.g., 40 plant slots per 4-foot by 12-foot module) and configured to hold plants during a finishing stage and up to harvest. By placing young plants first in modules with greatest plant slot densities and then transiting these plants to modules characterized by lower and lower plant slot densities as the plants increase in size and maturity, the facility can house and grow more plants per module on average and therefore achieve greater space efficiency (i.e., a number of plants per floor area within the facility).

The system 100 can thus function to automatically transfer plants from modules of higher plant slot densities to modules of lower plant slot densities as these plants mature. For example, the system 100 can automatically: transfer sprouts from a seeding tray—containing plant slots at a first density suitable for plants of this type up to a sprout stage—into a first module of the nursery-type containing plant slots at a second density suitable for plants of this type up to an early-heading stage; later transfer early-heading plants from the first module to a second module of the finishing-type containing plant slots at a third density suitable for plants of this type up to a fully-matured stage; and finally remove fully-matured plants from the second module for processing, packaging, and distribution from the facility.

Furthermore, because removal of plants from a module may be obstructed by leaves of these plants as the plants approach a growth stage necessitating transfer to another module of lower plant slot density, the system 100 can capture an optical scan (e.g., a photographic image) of a first module and analyze this optical scan for visual indicators of plant size (e.g., width, height) and/or quality (e.g., color) to confirm that these plants meet various size and/or quality targets. If at least a threshold proportion of plants in the first module exceed these targets, the system 100 (e.g., the robotic manipulator) can automatically transfer plants in the first module in sequence: from a first plant slot in the first module best accessible to the robotic manipulator when the first module is full; to a second plant slot in the first module best accessible to the robotic manipulator once the first plant slot is cleared; . . . to a last plant slot in the first module accessible to the robotic manipulator once a second-to-last plant slot in the first module is cleared. Once a plant is removed from the first module, the system 100 (e.g., the robotic manipulator) can also measure a weight of the plant to confirm that the plant passes a weight target before transferring the plant to the second module. However: if the optical scan indicates that less than a threshold proportion of plants in the first module exceed the size target, the system 100 can return the first module to a grow area in the facility for further maturation of these plants; if the optical scan indicates that more than a threshold proportion of plants in the first module fall below a quality target, the system 100 can discard plants in the first module; and if a weight measurement of a plant falls below a target weight, the system 100 can either discard the plant or transfer the plant to a third module of the same type as the first module and then return the third module to a grow area in the facility for further maturation of this and other underweight plants from the first module.

The system 100 (e.g., the controller 104, the robotic manipulator, and the loader) can therefore retrieve modules; visually inspect plants in these modules for growth deficiencies, growth abnormalities, and/or pests; clear plants that meet a visual growth target for transfer into next modules characterized by lower plant slot densities; check weights of plants; and automatically transfer plants into next modules, discard select plants, discard whole groups of plants in a module, and/or return whole modules for further maturation of their content based on visual data and/or weight data automatically collected from the plants.

3. System

As described above and shown in FIGS. 3 and 4, Blocks of the method S100 can be executed by a system 100 including: a local or remote controller 104, such as a remote server; a robotic manipulator 150 (e.g., a robotic arm) connected to the controller 104, located at a transfer station 140 within the facility 102, and outfitted with a camera, scale, and/or end effector 154 configured to retrieve plants from modules; and/or an automated loader 130 connected to the controller 104 and configured to retrieve modules from grow areas throughout the facility 102, to deliver modules to the transfer station 140, and to return modules to their assigned locations throughout the facility 102.

For example, the system 100 can include: a first module 110 assigned to a first grow location within an agricultural facility 102, defining a first array of plant slots 111 at a first density, and loaded with a first set of plants across the first array of plant slots 111; a second module 120 defining a second array of plant slots 121 at a second density less than the first density; a third module 122 defining a third array of plant slots 123 at the second density; and a transfer station 140 arranged inside the agricultural facility 102. The system 100 can also include a loader 130 configured to: autonomously navigate throughout the agricultural facility 102, autonomously deliver the first module 110 from the first grow location to the transfer station 140, autonomously deliver the second module 120 to adjacent the first module 110 at the transfer station 140, and autonomously deliver the third module 122 to adjacent the first module 110 in replacement of the second module 120 at the transfer station 140. The system 100 can further include a robotic manipulator 150 arranged at the transfer station 140, including an optical sensor 152 proximal the end effector 154, and configured to: engage a first plant, in the first set of plants, occupying a first plant slot in the first array of plant slots 111 in the first module 110; insert the first plant into a last slot in the second set of slots in the second module 120 in response to a viability parameter of the first plant exceeding a threshold value; withhold the first plant from the second module 120 in response to the threshold value exceeding the viability parameter of the first plant; sequentially transfer a first subset of plants from the first module 110 to the second array of plant slots 121 in the second module 120, the first subset of plants including the first plants; and sequentially transfer a second subset of plants from the first module 110 to the third array of plant slots 123 in the third module 122 in response to filling the second set of plants slots in the second module 120, the second subset of plants succeeding the first subset of plants in the first module 110.

The system 100 can further include a controller 104 configured to process data recorded throughout the system 100 and to manage various actions by elements within the system 100. For example, the robotic manipulator 150 can be configured to record a first image of the first plant arranged in the first slot in the first module 110 as the end effector 154 approaches the first plant, as described below; and the controller 104 can extract a viability parameter of the first plant from this first image and selectively trigger the robotic manipulator 150 to insert the first plant into the second module 120 or to discard the first plant into a discard bin based on a difference between the first viability parameter of the first plant and a target viability range.

3.1 Module

Figure 4:
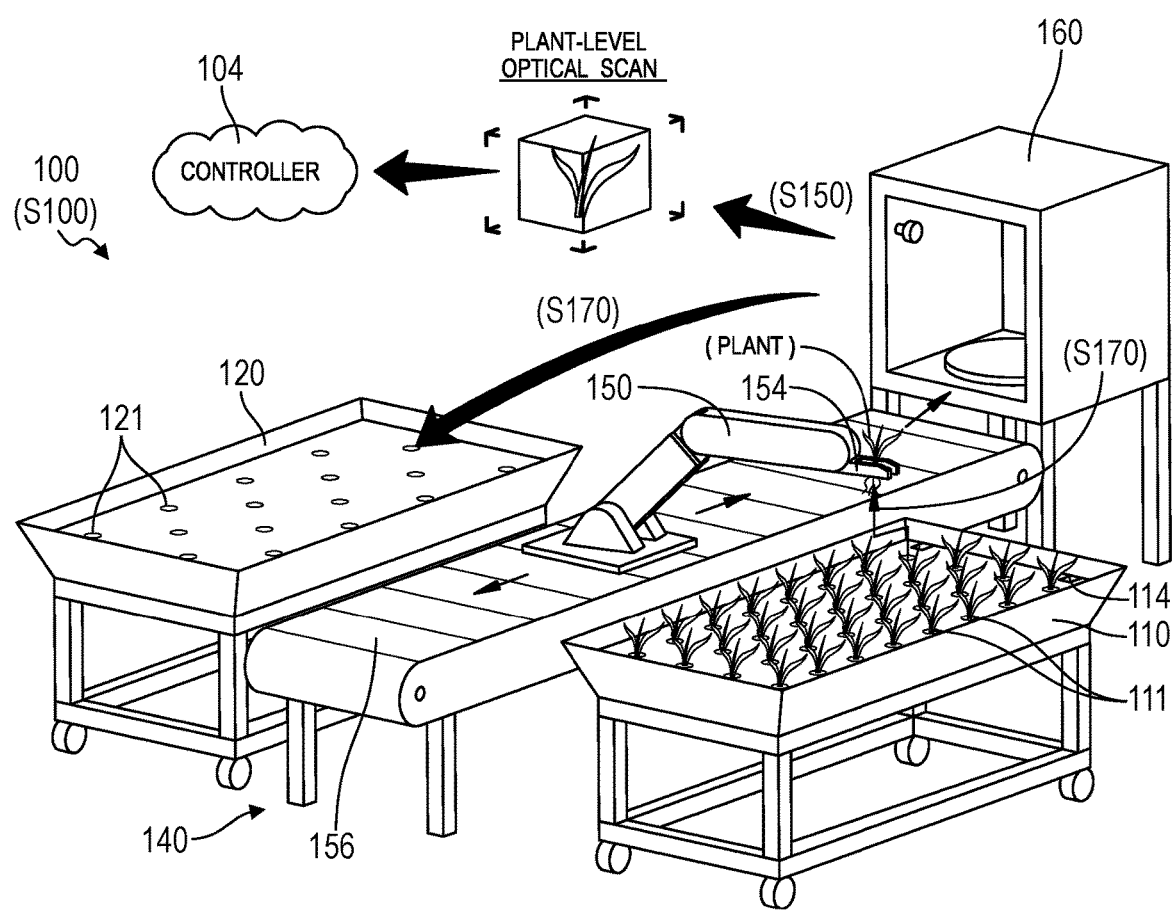
FIG. 4 is one variation of the system.

Each module in the system 100 is configured to house a group of plants throughout a segment of the growth cycle of these plants (e.g., four weeks of a twelve-week grow-period). Each module can define a standard size (e.g., four feet in width by eight feet in length by four feet in height; two meters in width by five meters in length by one meter in height) and can include a number of plant slots matched to the segment of plant growth cycle associated with the module. For example: a seeding-type module can include 192 plant slots; a nursing-type module can include 48 plant slots (i.e., one-quarter as many as seeding-type modules); and a finishing-type module can include twelve plant slots (i.e., one-quarter as many as nursing-type modules); as shown in FIG. 4, despite these modules defining the same overall size and geometry.

In one implementation, a module includes: a set of hydroponic trays (or hydroponic tubes), each defining a (linear) array of plant slots, wherein each plant slot is configured to receive and retain one plant (or one cluster of multiple plants); a carriage or frame supporting the set of hydroponic trays at an angle, such as declining 5° from horizontal; a reservoir fluidly coupled to the set of hydroponic trays and configured to collect water flowing out of the hydroponic trays; and a pump configured to cycle water from the reservoir back through the set of hydroponic trays. The module can additionally or alternatively be configured to transiently connect to a water supply line and to a water return line in the facility 102, which can provide a constant supply of water and nutrients to plants in this module. In this implementation, the module can also include: one optical fiducial 114 at the front of each hydroponic tray; optical fiducials 114 at each end of each hydroponic tray; one optical fiducial 114 adjacent each plant slot along each hydroponic tray; or optical fiducials 114 at three or four corners of the modules; etc. The system 100 can thus detect these optical fiducials 114—such as through optical sensors 152 integrated into the loader 130 and into the robotic manipulator 150—to identify and locate the module and to locate plant slots in each hydroponic tray in the module.

In another implementation, a module includes: an open tray configured to contain a standing volume of water and nutrients; a cover arranged over the open tray and including a set of perforations, wherein each perforation defines a plant slot configured to receive and retain one plant (or one cluster of plants); and a stand configured to support the tray off of the ground. In the implementation: the open tray can define a standard rectangular geometry, as described above; and the lid can include a rectangular cover configured to float in water in the tray. For example, the lid can include: a rigid panel (e.g., nylon or aluminum sheet) defining an array (e.g., a linear grid array, a dose-pack array) of plant slots; and floats extending across the underside of the rigid panel and exhibiting sufficient buoyancy and/or height to maintain an air gap between the top surface of water in the tray and the bottom surface of the lid when the array of plant slots in the lid are filled with plants, thereby maintaining exposure to air—and therefore oxygen—for upper root systems of these plants. Furthermore, in this example, because the lid floats on the water in the tray, the lid can ensure that roots of these plants remain in contact with water in the tray despite changes to the water level in the tray.

Furthermore, in this implementation, the module can include a set of optical fiducials 114 arranged on the top surface of the lid and/or the tray and configured to indicate position, orientation, distance, type, and/or unique identity of the module. For example, the module can include: one optical fiducial 114 (e.g., a unique barcode or quick-response code) arranged at each of three or four corners on the lid; three (identical) colored dots (e.g., yellow for nursery stage, red for finishing stage) arranged at corners of the lid or tray; or one optical fiducial 114 adjacent each plant slot on the lid (e.g., a colored circle, square, or polygon of known geometry and dimension encircling each plant slot); etc.

Alternatively, the module can include an open tray with a fixed lid. In this implementation, the tray and fixed lid can define geometries and features similar to those in the foregoing implementation but with the lid fixedly coupled to the rim of the tray, such as sealed against the rim of the tray to prevent water from splashing out of the tray when the module is moved by the loader 130.

The frame supporting the hydroponic tubes or tray can include a set of hard points that the loader 130 is configured to engage when moving the module between its assigned grow location on the floor of the facility 102 and a module docking location adjacent a transfer station 140. As described below, the loader 130 can autonomously navigate over the module, detect the module from overhead, and lift the module before moving the module laterally; in this implementation, the module can include optical fiducials 114 arranged across the top side of the tray, lid, or hydroponic tubes, etc. such that these optical fiducials 114 may be detected by the loader 130 and thus enable the loader 130 to align itself over the module before lifting the module from hard points on the frame. Alternatively, the loader 130 can be configured to autonomously navigate under the module. In this implementation, the module can include optical fiducials 114 arranged across the underside of the frame, tray, or hydroponic tubes, etc. such that these optical fiducials 114 may be detected by the loader 130 and thus enable the loader 130 to align itself under the module before engaging the module. Yet alternatively, the module can include: a set of wheels, casters, or rollers, etc.; a latch on a side or rear of the frame; and optical fiducials 114 adjacent the latch. The loader 130 can thus detect these optical fiducials 114 to align itself to the latch, engage the latch accordingly, and then pull or push the module between its assigned location on the facility 102 floor and a module docking location adjacent a transfer station 140.

However, a module can define any other structure or geometry and can define any other number or arrangement of plant slots.

3.2 Plant Cups

The system 100 can also include plant cups 112, wherein each plant cup 112 is configured: to mate with plant slots in modules of various types (e.g., seeding-, nursery-, and finishing-type modules); and to support the stem of a sprout as the sprout grows into a mature plant supported by the plant cup 112 in a sequence of modules of various types over time. In particular, each plant cup 112 can include: an internal bore configured to retain the stem of a plant as the plants grows over time; and an engagement feature configured to engage an end effector 154 on a robotic manipulator 150, as described below, to enable the robotic manipulator 150 to repeatably retrieve the plant cup 112 and plant, remove the plant cup 112 and plant from a plant slot in one module, inspect the plant, and then place the plant cup 112 and plant into a plant slot in another module.

In one implementation, each plant cup 112 defines a shoulder configured to extend vertically above a plant slot—when set in the plant slot—to enable a static or actuatable jaw extending from the end effector 154 on the robotic manipulator 150 to engage the plant cup 112 and to retrieve the plant cup 112 and its associated plant from its plant slot in Block S140, as shown in FIG. 1. For example, a plant cup 112 can define an inverted cone that: self-centers in a plant slot; permits some slop in alignment of an end effector 154 to the plant cup 112 when the robotic manipulator 150 retrieves the plant cup 112 from a plant slot; permits some slop in alignment of the plant cup 112 to a plant slot when the robotic manipulator 150 inserts the plants cup into a plant slot; and includes a flange along its upper (i.e., larger) edge to prevent the plant cup 112 from slipping fully through jaws on the end effector 154 when the robotic manipulator 150 engages and lifts a plant out of a module via the plant cup 112. The plant cup 112 can also include a thru-bore extending through the center axis of the inverted cone, configured to accept a plant stem, and defining a diameter sufficient to permit the plant to grow in the plant cup 112 over time. The thru-bore can also be filled with foam or other soft or decomposable material to support the stem of a smaller sprout when the sprout is first placed in the plant cup 112. The plant cup 112 can further include a keyed feature configured to rotationally register the plant cup 112 to the end effector 154 and/or to a plant slot.

However, the plant cup 112 can define any other form or feature.

3.3 Loader

Figure 3:
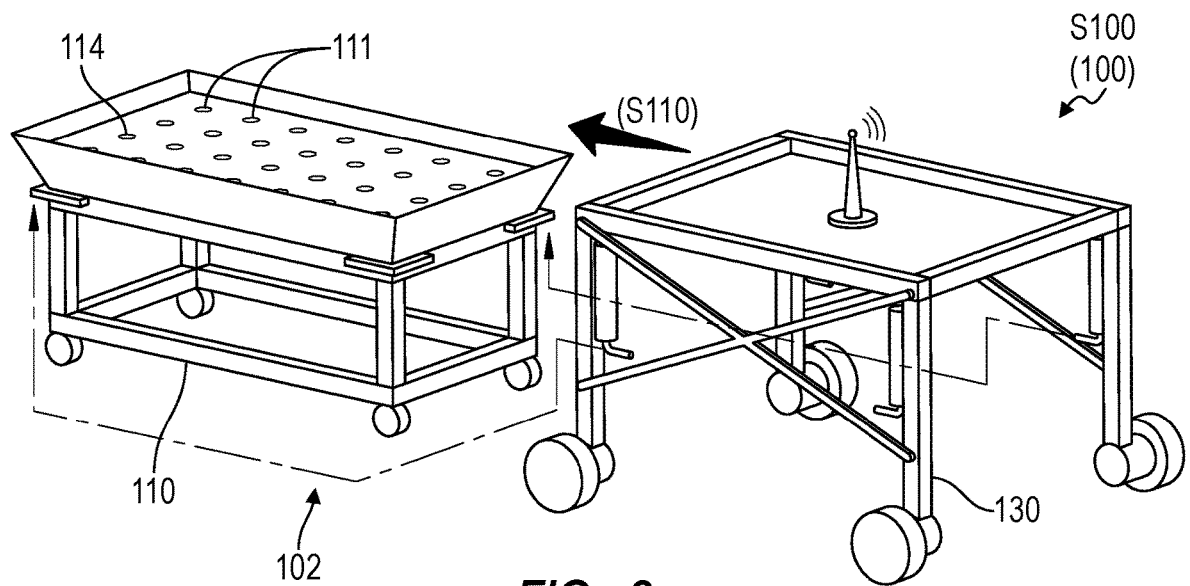
FIG. 3 is one variation of the system.

As shown in FIGS. 1 and 3, the loader 130 (e.g., a wheeled autonomous vehicle) is configured to navigate autonomously throughout the facility 102: to relocate modules to a module docking location adjacent a transfer station 140 in preparation for loading plants into or unloading plants from these modules in Block Silo; and to selectively return these modules to their assigned grow locations throughout the facility 102. In particular, the loader 130 can be configured to automatically navigate throughout the facility 102 to a particular location under or near a module, to couple to or lift the module, to navigate—with the module—to a transfer station 140 within the facility 102, and to release (or "deposit") the module at the transfer station 140. The robotic manipulator 150 can be arranged near the center of the transfer station 140, and the loader 130 can arrange a first module 110 of a nursery-type and a second module 120 of a finishing-type adjacent the robotic manipulator 150 at the transfer station 140 in order to enable the robotic manipulator 150 to navigate its end effector 154 across both the full extent of plant slots in the first module 110 and the full extent of plant slots in the second module 120. The loader 130 can also deposit a third module 122 of the finishing-type to the transfer station 140, such as adjacent the second module 120, and the robotic manipulator 150 can transition to transferring cleared plants from the first module 110 to the third module 122 once all plant slots in the second module 120 are filled. The loader 130 can also deposit a fourth module 114 of the nursery-type (e.g., an "extended grow time" module of the nursery-type) to the transfer station 140, and the robotic manipulator 150 can transfer underweight plants removed from the first module 110 into the fourth module 114 to enable access to a next plant in the first module 110, which may be of a sufficient weight for transfer into the second module 120 of the finishing-type. The loader 130 can then return the second, third, and/or fourth modules to assigned grow areas within the facility 102, such as under a translucent roof and/or under artificial lighting.

The loader 130 can also deliver a seeding tray to the transfer module, and the robotic manipulator 150 can implement similar methods and techniques to check sizes and weights of plants in the seeding tray and to sequentially transfer plants from the seeding tray into the first module 110 before the loader 130 returns the first module 110 to an assigned grow area within the facility 102. Alternatively, the system 100 can include a second robotic manipulator 150 arranged at a second transfer station 140 within the facility 102, and the loader 130 can deliver the first module 110 and the seeding tray to the second transfer station 140, and the second robotic manipulator 150 can transfer sprouts from the seeding tray into the first module 110.

3.4 Transfer Station

As shown in FIGS. 1 and 4, the system 100 also includes a transfer station 140 arranged within the facility 102 and defining a location at which plants are autonomously inspected and transferred from a first module 110 (e.g., a nursery-type module) containing a higher density of plants slots to a second module 120 (e.g., a finishing module) containing a lower density of plants slots.

The system 100 can also include a robotic manipulator 150: arranged at the transfer station 140; defining a multi-link robotic manipulator 150 that is sufficiently mobile to reach each plant slot in a module temporarily positioned at the transfer station 140; including an end effector 154 configured to engage plant cups 112 supporting plants in this module; and/or including an optical sensor 152 (e.g., a multispectral camera, or a stereoscopic camera, etc.) configured to record module-level optical scans of modules delivered to the transfer station 140 and/or to record plant-specific optical scans of plants in these modules, as described below. The system 100 (e.g., the controller 104) can process these optical scans (or otherwise process optical data recorded by the optical sensor 152 or process the field of view of the optical sensor 152) to detect optical fiducials 114 on these modules, to detect plants in these modules, and to qualify or quantify viability of these plants.

In one implementation, the robotic manipulator 500 includes: a base rigidly mounted to a floor of the facility 102 at a transfer station 140; an end effector 154 configured to engage plant cups 112 and supporting one or more optical sensors 152; and multiple independently-operable links and joints that couple between the base to the end effector 154 and that cooperate to navigate the end effector 154 across full lengths and widths of plant slots in modules (e.g., a nursery-type module and a finishing-type module) temporarily positioned at the transfer station 140.

Alternatively, the transfer station 140 can include a (short) bi-directional conveyor 156 (or other linear slide or linear actuator) rigidly mounted to the floor of the facility 102 at the transfer station 140 and configured to move a sled along the length of a module docking location at the transfer station 140. The base of the robotic manipulator 150 can be mounted to the sled, and the conveyor 156 can thus move the robotic manipulator 150 along the length of the module docking location. For example: modules in the system 100 can be approximately four feet in width and eight feet in length; the loader 130 can temporarily position a first module 110 in a module docking location at the transfer station 140 with a long edge of the first module 110 adjacent and approximately parallel to the conveyor 156; and the robotic manipulator 150 can be configured to reach and reliably engage a plant cup 112 in a plant slot offset from the centerline of the conveyor 156 by up to six feet (i.e., more than the width of the module but less than the length of the first module 110.) In this example, the conveyor 156 can thus move the robotic manipulator 150 linearly along (all or a portion of) the length of the module docking location in order to enable the robotic manipulator 150 to reach and reliably engage plant cups 112 along the full length of the far long side of the first module 110. In this implementation, the conveyor 156 can thus function to move the robotic manipulator 150 linearly along the length of the module docking location—and thus along a long edge of a module temporarily positioned in the module parking zone—in order to: enable a robotic manipulator 500 with a smaller working volume to execute Blocks of the method S100 at the transfer station 140; and/or to enable the system 100 to maintain high positional accuracy and control of the end effector 154, since positional accuracy and control of the end effector 154 may vary inversely with distance of the end effector 154 from the base of the robotic manipulator 150. In this variation, the robotic manipulator 150 and the conveyor 156 are described below generally as the "robotic manipulator 150."

In one variation, the robotic manipulator 150 further includes a weight sensor 158—such as in the form of a strain gauge integrated into a joint or into the end effector 154—configured to output a signal representing a weight or mass of a plant retrieved by the robotic manipulator 150, as described below.

3.5 Optical Inspection Station

In one variation shown in FIG. 4, the system 100 includes an optical inspection station 160 located at the transfer station 140 and physically accessible to the robotic manipulator 150. In one implementation, the optical inspection station 160 includes: an enclosure defining an aperture configured to receive a plant via the robotic manipulator 150; a receptacle arranged inside the enclosure and configured to receive and support a plant cup 112 within the enclosure; a set of light elements configured to repeatably illuminate a plant placed over the receptacle by the robotic manipulator 150; and an optical sensor 152 (e.g., a 2D color camera, a stereoscopic color camera, and/or a multispectral camera, etc.) arranged inside the enclosure over the receptacle and configured to capture a 2D or 3D image of the plant when illuminated by the light elements. In this implementation, the optical inspection station 160 can also include: a rotary table arranged inside the enclosure, supporting the receptacle, and configured to rotate a plant placed in the receptacle; and optical fiducials 114 arranged on the outside of the enclosure, which the robotic manipulator 150 can detect through an optical sensor 152 arranged proximal its end effector 154 to determine the location of the end effector 154 relative to the aperture in the enclosure.

In the foregoing implementation, upon retrieving a plant from a module temporarily positioned in the module docking location, the robotic manipulator 150 can: autonomously navigate the end effector 154 toward the optical inspection station 160; detect an optical fiducial 114 on the exterior of the optical inspection station 160; register its motion to this optical fiducial 114; navigate the end effector 154 and plant through the aperture in the optical inspection station 160; deposit the plant onto the receptacle inside the optical inspection station 160; and then retract the end effector 154 before triggering the optical inspection station 160 to execute a scan routine. During a scan routine, the optical inspection station 160 can: activate the light elements; and trigger the optical sensor 152(s) to record 2D or 3D images of the plant, such as while the rotary table rotates 360° within the optical inspection station 160. The system 100 can then extract various characteristics of the plant from the 2D or 3D images—such as the size, shape, color, and pest indicators of the plant—as described below. The system 100 can additionally or alternatively store these 2D or 3D images of the plant in a file specific to the plant.

3.6 Multiple Transfer Stations

The method S100 is described below as executed by the system 100 to test and transfer plants from a first module 110 of a nursery-type to a second module 120 of a finishing-type. However, the system 100 can implement similar methods and techniques to transfer plants between modules of any other type, configuration, or plant slot density. For example; a first robotic manipulator 150 at a first transfer station 140 can be configured to transfer plants from a seeding tray into modules of the nursery-type; a second robotic manipulator 500 at a second transfer station 140 can be configured to transfer plants from modules of the nursery-type to modules of the finishing-type; and a third robotic manipulator 150 at a third transfer station 140 within the facility 102 can be configured to transfer plants from modules of the finishing-type onto a conveyor 156, into boxes, or onto pallets for manual or automated processing and shipment from the facility 102. However, the method S100 can be executed to automatically test and transfer plants between modules of any other types—that is, between modules defining plant slot densities suitable for any other segments or durations of the grow cycle of a particular plant, plant sub-species, or plant species, etc. grown in the facility 102.

The method S100 is also described as executed by the system 100 to automatically transfer lettuce through a sequence of seeding trays, nursery-type modules, and finishing-type modules. However, the method S100 can be implemented in a greenhouse or other agricultural facility 102 in conjunction with growing any other type of plant, such as to grow fruit, vegetables, legumes, flowers, shrubs, or trees, etc.

4. Module Delivery

Block S110 of the method S100 recites: dispatching a loader to autonomously deliver a first module from a first grow location within an agricultural facility to a transfer station within the agricultural facility, wherein the first module defines a first array of plant slots at a first density and loaded with a first set of plants at a first growth stage. (Block Silo can similarly receive a first module defining a first array of plant slots of a first density, wherein the first array of plant slots is loaded with a group of plants in a first growth stage.) Generally, in Block Silo, the system 100 (e.g., the controller 104) dispatches the loader to collect the first module from its location in a grow area of the facility and to deliver the first module to a transfer station at which a robotic manipulator (or other system) is located within the facility, as shown in FIGS. 1 and 2A. For example, the loader can navigate to a location within the facility to which the first module was last delivered, position itself over or under the first module, actuate an elevator or latch to lift the first module off of the floor, navigate to a first module docking location on a first side of the robotic manipulator at the transfer station, and then lower the elevator or release the latch to return the first module to the floor at the first module docking location, as shown in FIG. 1.

The system 100 can implement similar methods and techniques to call the second module to the transfer station, and the loader can implement similar methods and techniques to retrieve the second module and deposit the second module at a second docking location at the transfer station, such as adjacent the robotic manipulator opposite the first module docking location at the transfer station. For example, the system 100 can: dispatch the loader to autonomously deliver a second module—defining a second array of plant slots at a second density less than the first density and empty of plants—to the transfer station (e.g., to a second module docking location on a second side of the robotic manipulator opposite the first module docking location at the transfer station) for loading with viable plants from the first module in Block S112; dispatch the loader to autonomously deliver a third module—defining a third array of plant slots at the second density—to the transfer station for loading with viable plants from the first module once plants slots in the second module are filled in Block S113; and dispatch the loader to autonomously deliver a fourth module—defining a fourth array of plant slots at the first density—to the transfer station in Block S114 for loading with undersized or otherwise lower-viability plants from the first module.

5. Module-Level Optical Scan

Block S120 of the method S100 recites recording a module-level optical scan of the first module; and Block S122 of the method S100 recites extracting a viability parameter of the first set of plants from features detected in the module-level optical scan. Generally, the system 100 collects initial optical data of plants arranged in the first module once the first module is delivered to the transfer station in Block S120 and then extracts various plant-related metrics from these optical data in Block S122. In particular, upon arrival of the first module to the transfer station, the robotic manipulator can record a module-level 2D or 3D scan of all plants currently housed in the first module in Block S120 and then implement computer vision techniques to extract relatively low-resolution plant size, plant quality, and/or indicators of pest presence, etc. for each of these plants from this module-level scan, as shown in FIGS. 1 and 2A

5.1 Module-Level Optical Scan by Robotic Manipulator

In one variation, the system 100 records the module-level optical scan—of the width and length of the first module—via an optical sensor arranged at the transfer station in response to arrival of the first module at the transfer station in Block S120. In one implementation, the robotic manipulator includes a stereoscopic color camera integrated into or arranged near the end effector, as shown in FIG. 1. Upon arrival of the first module at the transfer station, the robotic manipulator navigates the end effector to a predefined position that orients the camera over the first module and then triggers the camera to record a single 3D top-down photographic image (or "optical scan") of the first module. In particular, the system 100 can navigate the end effector on the robotic manipulator to a predefined scan position over the first module docking location—and therefore over the first module—in response to arrival of the first module at the transfer station and then record a module-level optical scan of the first module through the optical sensor integrated into the end effector or otherwise coupled to the robotic manipulator. The system 100 can then detect—in the module-level optical scan or otherwise in the field of view of the camera when the robotic manipulator occupies this scan position—an optical fiducial arranged on the first module, register motion of the end effector to this optical fiducial, and then position the end effector and camera at a target location over the first module relative to this optical fiducial before recording the optical scan of the first module via the camera in Block S120.

Alternatively, the robotic manipulator can include a 2D color camera (or multispectral camera, etc.). Upon arrival of the first module at the transfer station, the robotic manipulator can: navigate the end effector and the camera through multiple preset positions, such as in machine coordinates or relative to an optical fiducial detected on the first module; and record a two-dimensional photographic image of the first module through the camera at each of these positions in Block S120. The robotic manipulator (or the system 100 more generally) can then stitch these two-dimensional photographic images into a single 3-D photographic image (or "optical scan") representing plants currently housed in the first module.

Yet alternatively, the robotic manipulator can include a depth camera that includes an active infrared texture projector, and the robotic manipulator can record a depth image of the width and length of the first module in Block S120; and the robotic manipulator (or the system 100 more generally) can reconstruct 3-D shapes of plants in the first module from this depth image. However, the robotic manipulator can implement any other method or technique to capture a 2-D to 3-D optical scan of the first module.

Once this optical scan of the first module is this recorded in Block S120 and before initiating a transfer cycle to move plants from the first module to a second module nearby, the system 100 can extract metrics of plants in the first module and confirm that these plants meet predefined checks—such as size, leaf color, or lack of pest indicators—based on these metrics in Block S122.

5.2 Plant Size

In one implementation, the system 100 checks that plants currently housed in the first module are generally of a size sufficient to warrant transfer from the first module to a second, finishing-type module. In particular, if plants in the first module generally exceed a preset threshold size, these plants may grow faster and be of higher quality if transferred to the second module. However, if metrics extracted from the module-level scan image of the first module indicate that plants in the first module do not generally exceed the preset threshold size: transfer of these plants to the second module may yield minimal—or may even negative—impact on grow rate and quality of these plants while simultaneously reducing efficiency of plant distribution throughout the facility; and use of the robotic manipulator to transfer plants out of the first module may delay transfer of higher-need plants out of another module. Therefore, the system 100 can analyze the module-level optical scan of the first module to determine whether the plants are generally of sufficient size before either: triggering the loader to return the first module to its previous grow location within the facility; or triggering the robotic manipulator to initiate a transfer cycle in which the robotic manipulator sequentially selects plants from the first module and scans these individual plants (e.g., at greater resolution) before discarding or placing these individual plants in the second module.

In this implementation, the system 100 can execute computer vision techniques, such as edge detection or blob detection, to: identify a perimeter of the first module in the optical scan; count a number of green pixels in the optical scan (e.g., a number of pixels exceeding a threshold intensity or brightness in the green color channel in the optical scan); and then authorize plants in the first module for transfer to a second module if the ratio of green pixels to a total number of pixels in the image exceeds a threshold ratio (and vice versa in Block S130 described below). Similarly, the system 100 can implement a color classifier to classify a likelihood that pixels in the optical scan represent a plant and then count the number of pixels in the optical scan that are classified as 'likely to represent a plant.'

The system 100 can implement these methods and techniques for each color channel in the optical scan, merge classifications for corresponding pixels in each color channel, count a number of pixels in a composite color space that are 'likely to represent a plant,' and then authorize the robotic manipulator to execute a sequence of transfer cycles to move plants outs of the first module and into a second, finishing-type module if the count of pixels classified as 'likely to represent a plant' exceeds a threshold pixel count or exceeds a threshold proportion of all pixels in the optical scan that correspond to the first module. The system 100 can therefore "pass" or "fail" plants housed in the first module based on fill factor—that is, a proportion of foliage or leaf cover area over the first module detected in a two-dimensional optical scan of the first module, as shown in FIGS. 1 and 2A.

Similarly, the system 100 can detect optical fiducials on the first module in the optical scan and align a preexisting plant slot map for the module type of the first module to these optical fiducials to locate approximate centers of each plant slot—and therefore each plant—in the first module. For a first plant slot in the first module thus located in the optical scan, the system 100 can then: detect a duster (or "blob") of green pixels—exceeding a threshold intensity or brightness in the green color channel in the optical scan—radiating from the approximate center of the first plant slot in the optical scan; associate this cluster of green pixels with a first plant in the first plant slot in the first module; estimate a size (e.g., an approximate diameter) of the first plant based on a size and geometry of this duster of green pixels; and repeat this process for each other plant slot located in the first module. The system 100 can then authorize the robotic manipulator to transfer plants in the first module to the second, finishing-type module: if the mean or average size of plants in the first module exceeds a threshold size; or if at least a threshold proportion of plants in the first module exceeds a preset minimum plant size; etc.

In the implementation described above in which the system 100 records a 3D optical scan of the first module in Block S120, the system 100 can: implement similar methods and techniques to detect optical fiducials on the first module in the optical scan; align a preexisting plant slot map for the module type of the first module to these optical fiducials to locate approximate centers of each plant slot—and therefore each plant—in the first module; calculate a plane (approximately) intersecting each plant cup and/or plant slot in the first module; and then extract a peak height of a surface over the center of each plant slot located in the 3D optical scan and normal to the plane. The system 100 can: store peak height values for each plant slot as approximate heights of corresponding plants in the first module; and then authorize these plants in the first module for transfer to a second module if the mean or average height of these plants exceeds a threshold height or if at least a threshold proportion of plants in the first module exceed a minimum plant height, etc.

Therefore, the system 100 can: detect a first optical fiducial on the first module in the module-level optical scan; estimate locations of the first array of plant slots in the first module based on the first optical fiducial and a known plant slot layout for a first module type of the first module, as described above; detect areas of foliage of the first set of plants in the first module represented in the optical scan; estimate sizes of plants in the first set of plants based on discrete areas of foliage detected over locations of the first array of plant slots in the optical scan in Block S122; and then authorize the first set of plants for transfer out of the first module and into finishing-type modules if more than a threshold proportion of plants in the first set of plants exhibit estimated sizes exceeding a target plant size. Furthermore, the system 100 can: reject transfer of the first set of plants from the first module if less than the threshold proportion of plants in the first set of plants exhibit estimated sizes exceeding the target plant size; and then dispatch the loader to autonomously return the first module back to the first grow location within the agricultural facility.

However, the system 100 can implement any other method or technique to characterize sizes of plants in the first module based on features detected in the module-level optical scan and to selectively pass or fail these plants accordingly in Blocks S140 and S130, respectively.

5.1. Pests

Additionally or alternatively, the system 100 can implement computer vision techniques to detect pests or to detect indicators of pest pressure within the first set of plants in the first module from the optical scan recorded in Block S120. In particular, before authorizing direct contact between the robotic manipulator and plants in the first module, the system 100 can: trigger the robotic manipulator to record a 2D or 3D optical scan of the first module in Block S120; then analyze this optical scan for pests or indicators of pest pressure across plants housed in the first module; and authorize the robotic manipulator to initiate a sequence of transfer cycles only in the absence of detected pests or insufficient indicators of pest pressure across plants in the first module, thereby reducing opportunity for contamination of the robotic manipulator with pests through direct contact. For example, if the system 100 does detect pests or indicators of pests in the plants in the first module, the system 100 can: flag the first module; trigger the arm to move away from the first module or otherwise bar the robotic manipulator from contacting plants in the first module; and trigger the loader to move the first module to a separate quarantine area within the facility. Therefore, the system 100 can analyze the optical scan for pests or indicators of pests in plants in the first module and selectively trigger the robotic manipulator to execute a sequence of transfer cycles based on results of this analysis.

For example, the system 100 can scan the optical scan for dark (e.g., black or brown) round or lozenge-shaped spots that may indicate the presence of insects (e.g., ants, aphids, flies, silverfish, moths, or caterpillars, etc.) on plants within the first module. In this example, the system 100 can maintain a counter of such spots, authorize the first set of plants in the first module for transfer to a second module if the final value of this counter remains below a threshold value (e.g., "5"), and fail the first set of plants in the first module (e.g., flag the first module for quarantine and bar the robotic manipulator from interacting with these plants) if the final value of this counter exceeds the threshold value.

In another example, the system 100 can: record multiple optical scans of the first module over a period of time (e.g., five seconds) in Block S120; repeat the foregoing methods and techniques to identify dark spots in each of these optical scans; implement object tracking techniques to detect motion of these dark spots across the optical scans; confirm that these spots represent insects if the system 100 determines that these spots have moved throughout this sequence of optical scans; and then fail the first module accordingly. The system 100 can implement similar methods and techniques to detect parasites (e.g., chiggers, ticks, or mites) and/or gastropods (e.g., slugs) on leafy regions of plants shown in the optical scan.

In another example, the system 100 scans the optical scan for dark, discolored leaf regions that may indicate a nematode infestation. In this example, if the system 100 detects any such dark, discolored leaf region in the first module, calculates that a proportion of the leaf area in the first module are discolored, or detects any other sufficiently-strong indicator of pests in the first module, the system 100 can fail the first module and flag the first module and its contents for quarantine accordingly. The system 100 can similarly process the optical scan to detect mold or other fungus on plants in the first module.

Therefore, the system 100 can extract a set of features from the module-level optical scan and calculate a probability of pest presence in the first module based on the set of features in Block S122, such as based on one or more features detected in the optical scan as described above. The system 100 can then reject transfer of the first set of plants from the first module in Block S130 and dispatch the loader to autonomously deliver the first module to a quarantine station within the agricultural facility in Block Sill if the probability of pest presence exceeds a threshold probability. However, if the probability of pest presence is less than the threshold probability, the system 100 can authorize the first set of plants for transfer out of the first module and trigger the robotic manipulator to sequentially transfer plants from the first module into the second module accordingly in Block S140.

However, the system 100 can implement any other methods or techniques to detect pests—of any other type—directly or to infer the presence of pests in plants in the first module from color data contained in one or a sequence of optical scans of the first module.

5.4 Leaf Color

The system 100 can also extract color values from regions of the optical scan that correspond to leaves or other plant matter and can authorize the first set of plants in the first module for transfer to a second module if these color values fall within a target range (and vice versa). In particular, leaf color may exhibit strong correlation to plant "health," which may exhibit strong correlation to plant viability, salability, flavor, and/or value once harvested. After recording an optical scan of the first module in Block S120, the system 100 can thus: extract color values of plants in the first module from the optical scan; qualify or quantify health of plants in the first module according to their corresponding color values; and authorize the robotic manipulator to initiate a sequence of transfer cycles to transfer these plants from the first module to a second, finishing-type module if the average health of these plants exceeds a preset minimum health value or if at least a minimum proportion of these plants exceeds a preset minimum health value.

Therefore, if visual characteristics of plants in the first module generally indicate that plants in the first module are unhealthy or otherwise exhibit low viability, the system 100 can queue the loader to remove the first module to a discard station in which the contents of the first module are discarded (e.g., to a remote compost bin), rather than waste robotic manipulator resources distributing plants that may be unlikely to recover to yield high-quality produce when harvested at a later time. (The system 100 can alternatively trigger the robotic manipulator to remove plants from first module and immediately discard these plants (e.g., to a local compost bin at the transfer station)).

In one implementation, the system 100 implements template matching or object recognition techniques to identify leaves in the optical scan, such as based on template images or models of leaves of plants of the same type and at similar growth stages as the first set of plants in the first module. The system 100 can then correlate light-colored (e.g., yellow, tan, brown) regions around perimeters of these leaves with chemical burns or insufficient nutrient supply and then flag these plants accordingly. The system 100 can then reject the first module entirely if: more than a threshold number of plants in the first module exhibit such chemical burns or indicators of insufficient nutrient supply; or if more than a threshold leaf area of plants in the first module exhibit such chemical burns or indicators of insufficient nutrient supply.

For example, upon rejecting the first module, the system 100 can: trigger the loader to deliver the first module to a discard station for removal and disposal of these plants; and then trigger the loader to deliver the first module to a repair station at which the first module may be inspected for defects and repaired or replaced with a like module if necessary. Alternatively, upon rejecting the first module, the system 100 can: calculate an adjusted nutrient blend for plants in the first module in order to preempt such chemical burns or improper nutrient supply in the future; and then assign this adjusted nutrient blend to the first module (and to other like modules containing plants of the same type in similar growth stages throughout the facility).

Yet alternatively, in the foregoing example, the system 100 can: determine that the module is malfunctioning based on chemical burns or improper nutrient supply thus detected in plants in the first module; dispatch the loader to deliver a third module of the same type as the first module (e.g., a nursery-type module) to the transfer station; trigger the robotic manipulator to transfer all plants (or all salvageable plants) from the first module to the third module; trigger the loader to deliver the first module to the repair station; and trigger the loader to deliver the second module to a recovery area within the facility at which these plants may recover from these chemical burns or nutrient deficiency, such as under lower-light-intensity and lower-temperature conditions.

In a similar example, if the system 100 identifies heat burns on plants in the first module from the optical scan, the system 100 can: trigger the loader to deliver the first module to a discard station for removal and disposal of these plants; and set a lower augmented or secondary light intensity across the facility or at a select region in the facility in which the first module was previously stationed in order to preempt similar heat burns to plants in other modules in the facility. Alternatively, the system 100 can trigger the loader to return the first module to an area of the facility assigned a lower-light-intensity (e.g., a lower intensity of augmented or secondary light). Yet alternatively, the system 100 can implement methods and techniques described below to trigger the robotic manipulator to transfer plants in the first nursery-type module to a second finishing-type module and assign the second module to a lower-light-intensity grow location within the facility in order to enable these burned plants to recover and grow.

Therefore, if the system 100 detects heat burns, chemical burns, or other nutrient deficiencies in plants in the first module from features extracted from the optical scan, the system 100 can dispatch the loader to deliver the first module to: a location in the facility in which these plants may be discarded; a location in the facility in which the first module may be inspected and repaired as needed; or to a grow location in the facility in which these plants may recover; etc. without triggering the robotic manipulator to interact with plants in the first module in order to allocate operation of the robotic manipulator to transferring higher-viability plants between other modules. Alternatively, if the system 100 detects heat burns, chemical burns, or other nutrient deficiencies in plants in the first module, the system 100 can execute methods and techniques described below to trigger the robotic manipulator to transfer these plants to another module that may better enable these plants to recover.

5.5 Failing the First Module

Block S130 of the method S100 recites, in response to the viability parameter falling below a target value, rejecting the first module. Generally, in Block S130, the system 100 can flag the entire first set of plants in the first module as not ready for the next growth stage or otherwise not viable if the system 100 determines from the optical scan that all or at least a threshold proportion of plants in the first module fail one or more predefined viability metrics, such as: exhibit less than a threshold size (e.g., height, effective radius) or fill factor, exhibit foliage colors that fall outside of a predefined color set or color range, or exhibit more than a threshold probability of pest presence, as described above. For example, if the system 100 determines that plants in the first module are undersized but otherwise healthy (e.g., not exhibiting signs of chemical burns, malnourishment, or pests), the system 100 can flag the first module for an extended growing period (e.g., an additional 48 hours in its assigned grow location in the facility) and call the loader to return the first module to an assigned grow area within the facility, as shown in FIGS. 1 and 2A. However, if the system 100 determines that plants in the first module exhibit chemical burns or malnourishment too excessive for rehabilitation, the system 100 can: flag the first set of plants in the first module for disposal; and dispatch the loader to deliver the first module to a cleaning station within the facility. Similarly, if the system 100 determines that plants in the first module exhibit signs of pests, the system 100 can: flag the first set of plants in the first module for immediate quarantine and eventual disposal; flag the first module for sanitation; and dispatch the loader to move the first module away from the transfer station accordingly.

5.6 Authorizing the First Module

However, if the system 100 determines that all or a sufficient proportion of plants in the first module pass all predefined viability metrics—such as exceed a threshold size (e.g., height, effective radius) or fill factor, exhibit foliage colors that fall within a predefined color set or color range, and/or exhibit less than a threshold probability of pest presence, as described above—the system 100 can: authorize the first set of plants in the first module (e.g., a nursery-type module characterized by a first density of plant slots) for transfer to a second module (e.g., a second finishing-type module characterized by a second density of plant slots less than the first density of plant slots); and then trigger the robotic manipulator to execute a sequence of transfer cycles to move these plants out of the first module and into a next module in Block S140, as shown in FIGS. 2A and 2B. In particular, if the system 100 determines from features extracted from the optical scan that all or at least a threshold proportion of plants in the first module are of a size greater than a threshold size, exhibit foliage (or fruit) colors within a target color range, and/or exhibit no or limited signs of pests or pest pressure, the system 100 can trigger the robotic manipulator to execute a sequence of transfer cycles to move plants from the first module to a second module (and to a third module, etc.).

5.7 Plant Metrics

The system 100 can also populate a digital file (e.g., a standalone digital file or a database) for each plant in the first module with data extracted from the optical scan and/or from a secondary scan or image of the plant captured after the plant is removed from the first module, as described below.

Furthermore, the system 100 can compare data extracted from the current optical scan to data collected previously from the plants in the first module. For example, the system 100 can write—to each plant's associated digital file—a change in the size or color of the plant or a calculated growth rate of the plant since a last optical scan of the first module or of the plant more specifically. In particular, the system 100 can store plant-related data extracted from an optical scan of plants in the first module to digital files assigned to each of these plants—such as based on the plant slot in which each plant is located in the first module—or to the first set of plants in the first module generally; the system 100 can record and track growth metrics of plants throughout the facility and modify intensities of controlled lighting (e.g., natural light and artificial secondary lighting) within the facility, nutrients supplied to plants throughout the facility, plant types or strains grown in the facility, etc. based on these data.

5.8 Flagging Individual Plants

In one variation, the system 100 can implement methods and techniques described above to identify—from the module-level optical scan—individual plants in the first module that are undersized, unhealthy, or otherwise exhibit lower viability than other plants in the first module. The system 100 can then flag these individual plants and either trigger the robotic manipulator to discard these flagged plants or to transfer these flagged plants into another higher-plant-slot-density module with other lower-viability plants.

In one example, the system 100 implements a minimum threshold size check and minimum threshold "health" check (e.g., as a function of leaf color and indicators of pest presence) for each plant detected in the module-level optical scan of the first module. The system 100 can then flag each plant that fails either of the minimum threshold size check and the minimum threshold "health" check. In this example, the system 100 can also implement a minimum plant yield (e.g., 60%) from a module type of the first module to selectively pass or fail the first module as a whole. For example, if the total number or proportion of plants in the first module—that pass both the minimum threshold size check and the minimum threshold "health" check—exceeds the minimum plant yield, the system 100 can: authorize the robotic manipulator to transfer plants out of the first module; and trigger the robotic manipulator to selectively discard or divert certain plants—removed from the first module—that fail to meet either the minimum threshold size check or the minimum threshold "health" check. However, if the total number or proportion of plants in the first module—that pass both the minimum threshold size check and the minimum threshold "health" check—is less than the minimum plant yield, the system 100 can fail the first module and either: dispatch the loader to return the first module to its assigned grow location within the facility if these plants are generally too small; or dispatch the loader to deliver the first module to a plant disposal and cleaning station within the facility if these plants are generally unhealthy.

In another example, the system 100 can implement a maximum target yield for the module type of the first module, such as a maximum target yield of 94% yield (e.g., 45 out of 48 total plant slots) for nursery-type modules. In this example, when the first nursery-type module containing 48 plants is positioned at the transfer station, the system 100 can: identify the three smallest and/or least-healthy plants detected in the module-level optical scan recorded in Block S120; and flag these three plants for disposal by the robotic manipulator during subsequent transfer cycles.

In a similar example, nursery-type modules can include 50 plant slots, and finishing-type modules can include twelve plant slots. To distribute plants from the first, nursery-type module to four finishing-type modules, the system 100 can: identify the two lowest-quality plants in the first module from the optical scan of the first module recorded in Block S120; flag these two plants for culling; sequentially transfer plants from the first module to second, third, fourth, and then fifth modules of the finish type; and selectively discard the two flagged plants (e.g., into a compost bin) upon reaching these two plants during the transfer cycles.

In the foregoing examples, the system can thus: distinguish each plant, in the first set of plants in the first module, in the module-level optical scan; characterize viability of each plant in the first module based on features extracted from the module-level optical scan; access a target yield for a first module type of the first module; define a first subset of plants exhibiting greatest viability in the first subset of plants in the first module; and define a second subset of plants—in excess of the target yield—exhibiting lowest viability in the first set of plants in Block S122. In response to reaching a plant in the first subset of plants in the first module, the robotic manipulator can then transfer the plant to a next plant slot in the second array of plant slots in the second module in Block S140; however, in response to engaging a low-viability plant in the second subset of plants in the first module, the robotic manipulator can transfer the plant to a discard container or other secondary module.

The system 100 can thus programmatically discard a target number of lowest-viability plants from the first module when the first module is delivered to the transfer station, thereby: increasing average plant quality during both the nursery and finishing stages; increasing the efficiency with which these higher-quality plants are distributed throughout the facility; and/or eradicating strains of lower-quality plants from the facility over time.

5.9 Module-Level Optical Scan by Loader

In one variation in which the loader is configured to navigate over a module before engaging the module, as described above, the loader can include a similar optical sensor—such as a 2D color, 3D stereoscopic, or multispectral camera—facing downwardly toward the floor and defining a field of view that includes the width and length of a module below once the loader navigates into position over the module. In this variation, the system 100 can dispatch the loader to the first module; once the loader navigates into position over the first module and engages (e.g., latches onto or lifts) the first module, the loader can trigger the optical sensor to record an optical scan.

The system 100 can then process this optical sensor as described above before dispatching the loader to deliver the first module to the transfer station. In particular, in this variation, the system 100 can check plants in the first module for pests and/or indicators of pest presence before releasing the first module to the transfer station, therefore further isolating the robotic manipulator and the transfer station from possible contamination by pests. Similarly, the system 100 can: check plants in the first module for size and quality, as described above, and only dispatch the loader to deliver the first module to the transfer station if these plants are of sufficient size and quality, thereby improving efficiency of both the loader and the transfer station. Furthermore, if the system 100 detects undersized plants in the first module, the system 100 can prompt the loader to deliver the first module to a higher-yield grow location (e.g., a location with more natural light) in the facility; if the system 100 detects low-health plants in the first module, the system 100 can prompt the loader to deliver the first module to a recycling area where these plants are removed from the first module and composted; and if the system 100 detects pests in the first module, the system 100 can prompt the loader to deliver the first module to a separate quarantine area of the facility; etc. rather than deliver the first module to the transfer station.

Therefore, in this variation, the system 100 can: record a module-level optical scan of the first module via an optical sensor integrated into the loader in response to arrival of the loader over the first module at the first grow location; extract a viability parameter (e.g., representing a size, a shape, a color, and/or pest indicators) of the set of plants in the first module from this module-level optical scan, as described above; and then prompt the loader to autonomously deliver the first module to the transfer station if (and only if) the viability parameter of the first set of plants in the first module falls within the preset target range. Otherwise, the system 100 can dispatch the loader to scan plants in another module in the facility.

However, the system 100 can record an optical scan of the first module in any other way in Block S120 and extract other metrics or other insights into viability (e.g., quality and health) of plants in the first module in any other way from this optical scan in Block S122.

6. Transfer Setup and Module Registration

As described above, upon delivery of the first module to the transfer station, the system 100 can: record a module-level optical scan of the first module, such as through an optical sensor integrated into the robotic manipulator; detect one or more optical fiducials arranged in the first module in the optical scan; and align a preexisting plant slot map (or "layout") for the module type of the first module to these optical fiducials in order to locate approximate centers of each plant slot—and therefore each plant—in the first module, as shown in FIG. 2A. In particular, the system 100 can: detect a first optical fiducial on the first module in the module-level optical scan; estimate locations of the first array of plant slots in the first module based on the first optical fiducial and a known plant slot layout for a first module type of the first module; and then autonomously navigate the robotic manipulator to sequentially engage plants in these plant slots in the first module.

Similarly, when the loader delivers the second module to the second module docking location at the transfer station, the system 100 can: autonomously drive the end effector to a second scan position over the second module docking location to locate the second module in the field of view of the optical sensor; trigger the optical sensor in the robotic manipulator to record a second module-level optical scan of the second module; detect a second optical fiducial on the second module in the second module-level optical scan (or otherwise in the field of view of the optical sensor); and similarly estimate locations of the second array of plant slots in the second module based on the second optical fiducial and a known plant slot layout for a second module type of the second module. In particular, upon delivery of an empty module of the finishing-type (e.g., the "second module") at the transfer station, the system 100 can implement methods and techniques described above to: record a second optical scan of the second module; to identify fiducials on the second module; to project a plant slot map for the type of the second module onto the second optical scan based on positions and orientations of optical fiducials in the second optical scan to locate plant slots in the second module; and then set a fill order or fill sequence for transferring plants from the first module into the second module. For example, the system 100 can: pair a first plant slot in the first module nearest the robotic manipulator with a last plant slot in the second module further from the robotic manipulator; pair a second plant slot in the first module adjacent the first plant slot with a second-to-last plant slot adjacent the last slot in the second module; . . . and pair a last plant slot in the first module furthest from the robotic manipulator with a first plant slot in the second module nearest the robotic manipulator.

Generally, the robotic manipulator retrieves plants in sequence along a row of plant slots from one end of the first module to the opposite end of the first module from a row of plant slots nearest the robotic manipulator to a row of plant slots furthest from the robotic manipulator. Similarly, the robotic manipulator can place plants in sequence into the second module, such as from a far end of the second module to a near end of the second module from a row of plant slots furthest from the robotic manipulator to a row of plant slots nearest the robotic manipulator. Therefore, once the second module is placed (and locked in position) at the transfer station, the robotic manipulator can: scan the second module, such as described above; identify fiducials and/or open plant slots on the second module in the optical scan; and module map a predefined loading path—corresponding to a type of the second module—onto these fiducials and/or plant slots on the second module. For example, the robotic manipulator (e.g., a control module coupled to or integrated into the robotic manipulator or other computing device within the system 100) can implement computer vision techniques—such as edge detection, object recognition, pattern recognition, optical character recognition, template matching etc.—to identify optical fiducials patterned across hydroponic trays in the second module and/or to directly identify plant slots in these hydroponic trays, as shown in FIG. 1. In this example, the module map can specify a starting plant slot, a starting row of plant slots, a fill direction for rows of plants in plant slots, or a plant slot fill schedule, etc. relative to optical fiducials and/or plant slot patterns on modules of the finishing-type. The robotic manipulator (or other computer device within the system 100) can then align the module map to fiducials or plant slots identified on the second module and then implement a plant slot fill schedule or other fill definitions from the module map to set an order for filling the second module and to identify a first plant slot to fill with a plant transferred from the first module.

Alternatively, the robotic manipulator (or other computing device within the system 100) can apply preloaded plant slot filling rules to optical fiducials, plant slots, and/or rows of plants in plant slots detected in the optical scan of the second module and then identify a first plant slot in the second module to fill with a plant transferred from the first module and set an order for filling the second module accordingly. However, the system 100 can implement any other methods or techniques to identify plant slots and to set a fill order for plant slots in the second module.

7. First Transfer Cycle

Block S140 of the method S100 recites, in response to the viability parameter exceeding the target value, navigating an end effector at an end of a robotic manipulator laterally toward a first plant; and Block S140 of the method S100 recites navigating the end effector vertically from a first plant slot to extract the first plant from the first plant slot. Generally, in Block S140, the robotic manipulator (visually) locates the first plant to remove from the first module and then executes a robotic manipulator path to navigate the end effector of the robotic manipulator to a position horizontally adjacent the first plant, then into contact with the first plant, and then vertically upward to remove the first plant from the first plant slot.

7.1 Plant Retrieval Path

In one implementation, the system 100 (e.g., the robotic manipulator) can: implement computer vision techniques to detect one or more optical fiducials in the field of view of the optical sensor on the robotic manipulator (e.g., in the module-level optical scan recorded in Block S120, as described above); register global motion of the end effector on the robotic manipulator to these optical fiducials on the first module; and define an order for sequentially removing plants from plant slots in the first module, such as based on a predefined plant transfer order for the first module type of the first module, as shown in FIGS. 2A and 2B.

For example, the system 100 can access a generic plant retrieval path that defines a sequence of waypoints that are spatially referenced to a center of a generic plant slot and that are executable by the robotic manipulator to navigate the end effector toward a generic plant at the generic plant slot, to engage the end effector to the generic plant at an engagement position, and to retract the end effector out of the generic plant slot. Once the system 100 determines locations (e.g., centers) of plant slots in the first module, the system 100 can define an order for removing plants from the first module, including: row by row from left to right along the robotic manipulator from a first row of plant slots nearest to the robotic manipulator to a last row of plants slots further from the robotic manipulator. The system 100 can then: locate the plant retrieval path relative to a first location of a first plant slot in the first array of plant slots in the first module—according to the plant removal order—to define a first plant retrieval path spatially referenced to the first slot and therefore to the first plant in the first module; and repeat this process for each other plant slot in the first module to generate an ordered set of plant retrieval paths, each spatially referenced to one corresponding slot—and therefore to one corresponding plant—in the first module.

The system 100 can then autonomously drive the end effector on the robotic manipulator along the first plant retrieval path (e.g., along each waypoint defined by the first plant retrieval path relative to the first slot to engage the first plant located in the first plant slot. For example, when executing the first plant retrieval path, the robotic manipulator can: navigate the end effector along a path vertically offset above the first module by a height greater than a maximum expected height of plants at the growth stage of plants in the first module; position the end effector above and laterally offset from the first plant slot in the first module; and then lower the end effector downward toward the first module. (Alternatively, the robotic manipulator can navigate the end effector from outside the bounds of the first module horizontally toward the first plant slot to avoid impact with plants in the first module.) Once the end effector reaches a preset height above the first module—such as a height referenced to the optical fiducial on the first module or a preset global height above the floor of the facility and based on a known height of modules in the facility—the system 100 can drive the end effector laterally toward the first slot to engage the end effector against a first cup currently supporting the first plant in the first slot in Block S140. For example, the robotic manipulator can navigate the end effector forward by a preset distance to engage the first cup or sample strain gauges in the robotic manipulator to determine when the robotic manipulator has come into contact with the first cup and then cease lateral motion of the end effector accordingly in Block S140.

Once the end effector has engaged the first cup in Block S140, the robotic manipulator can navigate the end effector vertically upward from the first module according to the first plant retrieval path in Block S140 in order to withdraw the first plant and its roots fully from the first plant slot, as shown in FIG. 1. For example, the robotic manipulator can draw the end effector vertically upward from the first plant slot by a distance exceeding a maximum expected length of roots of plants of this type at the current growth stage of plants in the first module. Alternatively, the robotic manipulator: can analyze images recorded by an optical sensor integrated into the end effector or recorded by a static optical sensor arranged nearby (e.g., in a base of the robotic manipulator) to identify roots extending below the first plant once the first plant is extracted from the first plant slot; and can confirm that these roots have been fully removed from the first plant slot before moving the end effector laterally toward the second module nearby.

However, the system 100 (e.g., the robotic manipulator) can implement any other method or technique to calculate a path for the end effector to engage and remove the first plant from the first slot in the first module and to execute this path in Block S140.

7.2 Plant-Specific Optical Scan by Robotic Manipulator

In one variation shown in FIGS. 2A and 2B, the system 100 also: collects plant-level optical data of the first plant as the robotic manipulator navigates the end effector into contact with the first plant; and then extracts plant-specific metrics for the first plant from these plant-level optical data. The system 100 can then determine whether to cull the first plant or transfer the first plant into the second module based on these plant-level optical metrics.

In one implementation, the generic plant retrieval path defines a sequence of waypoints that, when executed by the robotic manipulator, navigates an optical sensor in the robotic manipulator (e.g., in the end effector) about (e.g., encircling) a generic plant slot such that multiple sides of a generic plant in the generic plant slot fall within the field of view of the optical sensor as the end effector nears and eventually engages the generic plant. Therefore, by projecting the generic plant retrieval path onto the estimated location of the first plant slot in the first module to define the first plant retrieval path, as described above, the system 100 can calculate a sequence of waypoints that, when executed by the robotic manipulator, navigates the optical sensor in the robotic manipulator about the first plant slot such that multiple sides of the first plant in the first plant slot fall within the field of view of the optical sensor as the end effector nears and eventually engages the first plant.

Throughout this first plant retrieval path, the system 100 can also record multiple images of the first plant via the optical sensor in the robotic manipulator, such as when the end effector reaches each waypoint in this sequence of waypoints referenced to the first plant slot. For example, the system 100 can: record the module-level optical scan through the optical sensor integrated in the robotic manipulator when the robotic manipulator is occupying the first scan position of the first module in Block S120, as described above; implement methods and techniques described above to process the module-level optical scan in Block S122 and to project the generic plant retrieval path onto the estimated location of the first plant slot in the first module; autonomously drive the end effector from its current position at the first scan position to each waypoint in the sequence of waypoints in the first plant retrieval path to engage the end effector to the first plant in Block S140; and record a set of images of the first plant via the optical sensor during execution of the sequence of waypoints by the robotic manipulator in Block S160.

The system 100 can then extract a first viability parameter of the first plant from the first set of images of the first plant in Block S162. For example, the system 100 can: compile the set of images of the first plant into a 3-D representation of the first plant; and implement methods and techniques similar to those described above to extract a first viability parameter—such as representing a size, a color, a foliage density, and/or indicators of pest presence, etc.—of the first plant from this 3-D representation of the first plant in Block S162.

In this variation, the system 100 can also: withhold the first plant from the second module (e.g., discard the first plant or place the first plant in an alternate module, as described above) in Block S130 if the first viability parameter extracted from the representation of the first plant fails to exceed a threshold value; or confirm viability of the plant and insert the first plant into a plant slot in the second array of plant slots in the second module accordingly in Block S170 if the first viability parameter of the first plant does exceed this threshold value. Therefore, in this variation, the system 100 can collect additional plant-specific, higher-resolution optical data of the first plant as the robotic manipulator approaches the first plant, extract a viability of this first plant from these additional plant-specific optical data, and then selectively transfer or cull the first plant accordingly in Block S170.

In this variation, the system 100 can also store these additional plant-specific optical data (e.g., the 3-D image or raw images of the first plant) in a database or other digital file associated with the first plant, as described above.

7.3 Plant-Specific Optical Scan by Optical Inspection Station

In a similar variation shown in FIG. 4, once the robotic manipulator retrieves the first plant from the first plant slot in the first module, the system 100 can trigger the robotic manipulator to deposit the first plant into an optical inspection station arranged on the transfer station, as described above. The optical inspection station can substantially enclose the first plant, consistently illuminate the first plant, and thus record a high-resolution, repeatable plant-specific optical scan (e.g., a 3-D color image) of the first plant in Block S160. The system 100 can implement methods and techniques described above to extract a viability parameter of the first plant (e.g., based on geometry, color, leaf density, etc.) of the first plant from this plant-specific optical scan and selectively authorize the first plant for transfer or flag the first plant accordingly in Block S162.

For example: the robotic manipulator can retrieve the first plant from the first plant slot in the first array of plant slots in the first module and insert the first plant into the optical inspection station arranged at the transfer station; the optical inspection station can then record a 3-D image of the first plant; the system 100 can store the 3-D image of the first plant in a database associated with the first plant and extract a viability metric of the first plant from this 3-D image; and the robotic manipulator can then retrieve the first plant from the optical inspection station and transfer the first plant into a last plant slot—in the second array of plant slots—in the second module.

However, the system 100 can implement any other method or technique to collect plant-specific optical data of the first plant in Block S160 and to extract relevant metrics specific to the first plant from these plant-specific optical data in Block S162.

7.4 Weight

Another variation of the method S100 includes: Block S150, which recites measuring a first weight of the first plant; and Block S172 which recites, in response to the first weight of the first plant falling below a threshold weight, discarding the first plant. Generally, the robotic manipulator measures a weight (or mass) of the first plant in Block S150, flags the first plant to be discarded if the weight of the first plant is less than a preset threshold weight (or mass) in Block S172, and clears the first plant for transfer into the second module for the next stage of plant growth if the weight of the first plant exceeds the preset threshold weight (or mass).

In one implementation shown in FIG. 1, the robotic manipulator includes a set of (e.g., three) strain gauges arranged across three perpendicular axes and interposed between the end effector and an adjacent arm segment of the robotic manipulator (or between the end effector and jaws extending from the end effector). Prior to engaging the first plant in Block S140, the robotic manipulator can pause its motion, sample the set of strain gauges, and store values read from the strain gauges as a tare value, thereby calibrating the set of strain gauges to subsequently measure a weight of the first plant. Once the first plant is engaged by the end effector in Block S140 and fully removed from the first plant slot in Block S140, the robotic manipulator can again sample the set of strain gauges and calculate a weight of the first plant based on differences between these new values read from the strain gauges and the tare values recorded prior to retrieval of the first plant.

In this implementation, after removing the first plant from the first slot in Block S140, the robotic manipulator can read the strain gauges immediately and calculate a weight of the first plant accordingly from these data. The system 100 can also multiply this weight value by a static or time-based wetness coefficient (e.g., a coefficient less than 1.0 and a function of both the position of the first plant slot in the first module and an amount of time that has passed since water circulation through the first module ceased) in order to correct the calculated weight of the first plant for wetness or dampness of its roots. Additionally or alternatively, once the first plant is removed from the first plant slot in Block S140, the robotic manipulator can: rapidly oscillate the end effector to shake water from the first plant's roots into a collection canister below; activate a blower adjacent the first plant to blow water from the first plant's roots (and away from the first module), such as down or laterally into a collection canister); or pause its motion with the first plant over a collection canister as moisture drips from the first plant's roots prior to sampling the strain gauges in the robotic manipulator.

However, the robotic manipulator can include any other type of sensor arranged in any other location and configured to output a signal representative of a weight of the first plant. The robotic manipulator can also implement any other methods or techniques to calibrate the sensor prior to retrieving the first plant and to interpret a signal read from the sensor as a weight (or mass) of the first plant.

The system 100 can then compare the weight of the first plant to a preset threshold weight (or representative value) assigned to a plant of this type at this stage of growth, as shown in FIG. 1. If the weight of the first plant is less than this preset threshold weight, the robotic manipulator can implement methods and techniques described below to place the first plant into a next open plant slot in a third module of the nursery-type. The system 100 can then assign an extended grow duration (e.g., 48 hours) to the third module as a function of a magnitude difference between the weight of the first plant (and weights of other plants placed in the third module) and the preset threshold weight. Once the first module is emptied or once the third module is filled with underweight plants from the first and other modules, the system 100 can dispatch the loader to return the third module to an assigned grow area within the facility, thereby providing the first plant—which may be smaller than the majority of other plants in the first module—opportunity to mature to a size appropriate for transfer into a finishing-type module. Alternatively, if the weight of the first plant is less than the preset threshold weight, the robotic manipulator can dispense the first plant into a loose discard canister nearby in Block S172.

Therefore, the robotic manipulator can retrieve the first plant from the first plant slot in the first array of plant slots in the first module in Block S140; oscillate the first plant to displace moisture from the first plant's roots; record a first weight of the first plant via a weight sensor coupled to the robotic manipulator (e.g., a strain gauge arranged in the end effector) in Block S150; withhold the first plant from the second module if the first weight of the first plant fails to reach a threshold weight in block S172; and insert the first plant into a plant slot in the second module if the first weight of the first plant exceeds the threshold weight in Block S170.

However, if the weight of the first plant exceeds the preset threshold weight, the system 100 can authorize the first plant for transfer into the second module.

7.5 Root Alignment

In one variation, prior to placing the first plant into a next open plant slot in the second module (or in the third module), the robotic manipulator can straighten or align the first plant's roots. For example, the robotic manipulator can oscillate the end effector along a vertical axis in order to shake the first plant's roots into vertical alignment. In another example, the robotic manipulator can navigate the roots of the first plant into an electromechanical root alignment mechanism and activate the electromechanical root alignment mechanism to straighten the first plant's roots. In this example, the electromechanical root alignment mechanism can include a vertical split cylinder configured to close around roots of a plant to straighten its roots and to then open to release the first plant. However, the robotic manipulator can implement any other technique or interface with any other device to straighten the first plant's roots prior to transfer (or "stuffing") into an assigned plant slot in the second (or third) module.

7.6 Plant Slot Filling

Block S170 of the method S100 recites, in response to the first viability parameter exceeding a target value, transferring the first plant into a last plant slot in the second array of plant slots in the second module. Generally, in Block S170, the system 100 can autonomously navigate the end effector—and therefore the first plant—over a last plant slot in the second array of plant slots in the second module and then lower the end effector toward the second module to insert the first plant into the last plant slot in the second module, as shown in FIGS. 1, 2A, and 4

In one implementation, the system 100 implements methods and techniques similar to those described above to: record a second module-level optical scan of the second module; project a preexisting plant slot map for the module type of the second module onto one or more optical fiducials detected in the second module-level optical scan to locate approximate centers of each (empty) plant slot in the second module (or detect the empty plant slots in the second module directly in the second module-level optical scan); access a plant deposit order for inserting plants into a second module type of the second module; access a generic plant deposit path that defines a sequence of waypoints that are spatially referenced to a center of a generic plant slot and that are executable by the robotic manipulator to navigate the end effector toward the generic plant slot, to insert a generic plant in the end effector into the generic plant slot, to disengage the end effector from the generic plant, and to retract the end effector away from the generic plant slot; locate the plant deposit path relative to a last location of a last plant slot in the second array of plant slots in the second module—according to a plant deposit order—to define a first plant deposit path spatially referenced to the last slot in the second module; and repeat this process for each other plant slot in the second module to generate an ordered set of plant deposit paths, each spatially referenced to one corresponding slot in the second module.

Therefore, the system 100 can locate a plant deposit path relative to a last location of a last plant slot in the second array of plant slots in the second module to define a first plant deposit path. Following execution of the first plant retrieval path to engage the first plant, and if the first plant is confirmed to have passed each viability check described above (and once roots of the first plant have be straightened, as described above), the robotic manipulator can autonomously drive the end effector on the robotic manipulator along the first plant deposit path to insert the first plant into the last plant slot in the second module.

For example, while executing the first plant deposit path (e.g., from the terminus of the first plant retrieval path, the weigh position, or the root alignment position), the robotic manipulator can maintain the first plant in an upright orientation and offset vertically above the second module by a distance related to (e.g., greater than) a maximum anticipated length of roots extending downwardly from plants of the same type at the same stage of growth. Once the first plant is arranged vertically over and is substantially coaxial with its assigned plant slot in the second module, the robotic manipulator can lower the end effector to insert the first plant into the last plant slot in the second module in Block S170, as shown in FIG. 1. Once the plant cup retaining the first plant passes into the last plant slot in the second module by a sufficient distance (e.g., at least 60% of the insert height of the plant cup), once the end effector reaches a target height above the second module, or once the end effector reaches a preset global height above the floor of the facility based on a known height of modules in the facility, the robotic manipulator can retract the end effector horizontally away from the first plant—such as by a distance exceeding a maximum anticipated radius of plants of the same type at the same stage of growth—thereby disengaging the end effector from the plant cup and releasing the first plant into the second module. (Alternatively, the robotic manipulator can estimate the radius of the first plant from a third photographic image of the top of the first plant recorded by the camera in the end effector prior to removing the first plant from the first module and retract the end effector from the first plant by at least this distance after placement into a plant slot in the second module and before executing a vertical path back toward the first module to retrieve a next plant.) The robotic manipulator can then move the end effector horizontally and/or vertically back toward the first module to retrieve a next plant from the first module.

However, the system 100 can implement any other method or technique to deposit the first plant into its assigned plant slot in the second module in Block S170.

7.7 Plant Discard

However, if the first plant fails to meet one or more viability checks—such as a size, color, weight, or pest presence check based on a module-level or plant specific optical scan—the system 100 can flag the first plant, as shown in FIGS. 1 and 2A. If the system 100 thus flags the first plant, the system 100 can trigger the robotic manipulator to deposit the first plant into a composting bin or discard bin located at the transfer station in Block S172. Alternatively, the system 100 can implement methods and techniques described above to dispatch the loader to deliver a fourth module substantially similar to the first module (e.g., characterized by a plant slot density similar to that of the first module) to the transfer station, such as adjacent the first and second modules; if the system 100 thus flags the first plant, the system 100 can thus trigger the robotic manipulator to insert the first plant into a next-available plant slot in an array of plant slots in the fourth module. In this example, the system 100 can: dispatch the loader to deliver the fourth module to a grow location in the facility once the fourth module is (sufficiently) full of plants; and later repeat the foregoing processes to call the fourth module back to the transfer station and to transfer plants out of the fourth module at a future time at which plants in the fourth module are anticipated to meet these viability checks.

7.8 Canned Transfer Cycles

Block S144 of the method S100 recites navigating the end effector laterally to a second plant, in the group of plants, arranged in a second plant slot in the first array of plant slots adjacent the first plant slot. Generally, once the system 100 transfers the first plant from the first module into a next open plant slot in the second module (or in the third module or in a loose discard bucket), the system 100 can repeat the foregoing methods and techniques to transfer a second plant from a second plant slot in the first module to a second-to-last plant slot in the second module—according to removal and deposit orders for the first and second modules—by executing a second plant retrieval path and corresponding plant deposit path calculated as described above in Block S144, as shown in FIGS. 1, 2A, and 2B. The system 100 can repeat this process for each subsequent plant in the first module until the first module is empty. For example, the robotic manipulator can retrieve plants in sequence: along a first row of plant slots nearest the robotic manipulator from a first end of the first module to the second end of the first module; then along a second row of plant slots adjacent the first row opposite the robotic manipulator from the first end of the first module to the second end of the first module; etc. until the first module is empty.

In the example described above in which the system 100 aligns a generic plant retrieval path to a first plant slot in the first module and aligns a generic plant deposit path to a last plant slot in the second module, the system 100 can repeat this process in preparation for transferring a second plant out of the first module once the first plant is moved to the second module. In particular, once the robotic manipulator moves the first plant to the last plant slot in the second module, the system 100 can: locate the generic plant retrieval path relative to a second location of a second plant slot—adjacent the first plant slot and exposed to the robotic manipulator by removal of the first plant—in the first array of plant slots in the first module to define a second plant retrieval path; locate the generic plant deposit path relative to a second-to-last location of a second-to-last plant slot in the second array of plant slots in the second module to define a second plant deposit path; autonomously drive the end effector on the robotic manipulator along the second plant retrieval path to engage a second plant located in the second plant slot; autonomously drive the end effector on the robotic manipulator along the second plant deposit path to insert the second plant into the second-to-last plant slot in the second module following execution of the second plant retrieval path to engage the end effector to the second plant; and then repeat this process until the first module is emptied of plants or until the second module is filled with plants.

8. Second Module Dispatch

In one variation shown in FIG. 2A, if the first module is not yet empty, but the second module is nearing capacity, the system 100 can dispatch the loader to deliver a third module—of the finishing-type—to the transfer station and then trigger the robotic manipulator to transfer remaining plants in the first module into plant slots in a third module once the second module is full. Generally, because the module of the nursery-type exhibits a higher density of plant slots than the second module of the finishing-type, as described above, the system can trigger the loader to sequentially deliver multiple modules of the finishing-type to the transfer station while the first module is unloaded, and the robotic manipulator can distribute plants from a first module of the first type into multiple modules of the finishing-type until the first module is empty.

In one implementation, as the second module nears capacity, the system 100 can call the loader: to retrieve a third empty module of the finishing-type, such as from a harvest station or from a cleaning station in the facility; to exchange the second full module with the third empty module; and to return the second module to an assigned location within the facility, such as a finishing area within the facility. In this implementation, once the third module is placed (and locked in position) at the transfer station, the robotic manipulator can: scan the third module; identify fiducials and/or open plant slots on the third module in this optical scan image of the third module; map a predefined loading path onto the optical scan of the third module; and identify a first plant slot in the third module specified as a starting point by the predefined loading path, such as described above. The robotic manipulator can then resume canned transfer cycles to sequentially transfer plants in the first module (sequentially from the current plant slot to the last plant slot in the first module) into the third module (sequentially from the last plant slot to the first plant slot in the third module) according to methods and techniques described above.

Therefore, in response to filling each plant slot in the second array of plant slots in the second module with a plant in the first subset of plants in the first module, the system 100 can dispatch the loader to autonomously deliver the second module from the transfer station to a second grow location within the agricultural facility. Furthermore, in response to transferring a last plant in the first set of plants out of the first module, the system 100 can: dispatch the loader to autonomously deliver the first module to a cleaning station within the agricultural facility in preparation for reloading the first module with a new set of plants (e.g., sprouts).

The system 100 can also implement timers to selectively trigger retrieval of the first module from its assigned grow location for transfer of the first set of plants to a second module characterized by a lower density of plant slots. For example, the system 100 can: dispatch the loader to autonomously deliver the first module to the first grow location at a first time in response to placement of the first set of plants—at an early-heading or "seedling" growth stage—into the first module; and then dispatch the loader to autonomously deliver the first module from the first grow location to the transfer station at a second time succeeding the first time by a predefined mid-heading grow duration (e.g., four weeks) such that the first set of plants in the first module are (approximately) at a mid-heading growth stage upon delivery to the transfer station. The system 100 can then implement the foregoing methods and techniques to transfer a first subset of these mid-heading growth stage plants from the first module to a second module. Furthermore, the system 100 can dispatch the loader to autonomously retrieve the second module from a second grow location in the facility at a third time succeeding the second time by a predefined mature-heading grow duration (e.g., four weeks) such that the first subset of plants in the second module are (approximately) at a mature-heading growth stage upon delivery to the transfer station. The system 100 can then implement the foregoing methods and techniques to transfer this first subset of plants—now mature—out of the second module and to place these plants in a bin or on a conveyor, etc. in preparation for trimming, packaging, and shipping these plants out of the facility.

9. Module Pre-Scheduling

In another variation, the system 100 calls the loader to deliver modules to the transfer station, triggers the robotic manipulator to scan these modules, and extracts plant size, quality, and/or pest pressure data from these scans, such as during high-bandwidth/low-demand periods at the transfer station. In particular, the system 100 can implement this process when the robotic manipulator at the transfer station is experiencing low load in order to rank or prioritize modules containing plants ready for transfer to modules of a next type and/or to detect pests more rapidly (e.g., in less than a two-week period between when plants are loaded into and then removed from a module). For example, plants in modules in different locations throughout the facility may grow at different rates due to varying amounts of sunlight exposure; the system 100 can therefore period-check growth of plants in modules throughout the facility and rank groups of plants in these modules for transfer to modules of next types accordingly in order to achieve greater transfer efficiency (e.g., transferred plants per unit time) at the transfer station during lower-bandwidth/higher-demand periods.

In one implementation, the system 100 implements methods and techniques described above to dispatch the loader to sequentially deliver—to the transfer station—a group of modules corresponding to a particular grow stage, such as a group of modules containing the oldest set of plants in this particular grow stage and flagged for impending transfer (e.g., within the subsequent 24 or 48 hours). For each module in this group, the system 100 can: trigger the robotic manipulator to scan the module; calculate a quantitative value representing a characteristic of plants in the module, such as a quantitative value representing an average color value, total fill factor, average size, or average shape, etc. of plants in the module from this optical scan; store the quantitative value with an identifier of the module in a database; and then trigger the loader to return the module—substantially unchanged—to its previous location within the facility. Once each module in this group of modules is thus scanned and its contents represented by a quantitative value, the system 100 can rank modules in this group by their quantitative values, such as by prioritizing modules with greatest fill factors, greatest color intensities in the green color channel, and/or largest plant sizes, etc. (The system 100 can also set a target transfer time and date or adjust a transfer schedule for these modules according to their quantitative values.)

During a transfer period in which plants in this group of modules are scheduled for transfer to later-stage modules or packaged for distribution, the system 100 can sequentially call modules in this group in order of priority. Once a module in this group is delivered to the transfer station, the system 100 can implement methods and techniques described above to: re-scan the module; confirm that optical parameters of plants in the module—extracted from the optical scan—meet various preset parameters; sequentially remove plants from the module; check that each removed plant passes a weight check; and then transfer plants from this module to a later-stage module or into packaging. The system 100 can repeat this process for each module in the group—by rank or priority—until less than a threshold proportion (e.g., 80%) of plants in the module pass optical checks and/or weight checks, at which point the system 100 can cease calls to the loader for remaining modules in this group and mark these remaining modules for transfer at a later date. For example, the system 100 can then insert these remaining modules into a next group of modules and repeat the foregoing methods and techniques to test this next group of modules on a subsequent day.

Therefore, during periods in which the loader and the robotic manipulator have excess bandwidth, the system 100 can: call the loader to deliver modules to the robotic manipulator for scanning; quantify or qualify a growth state of plants in each of these modules based on optical scans of these modules; and then set a schedule for transferring or harvesting plants from these modules accordingly. During subsequent periods in which plants in these modules are ready for transfer by the loader and/or the robotic manipulator have less bandwidth for moving and scanning modules, the system 100 can call these modules in order of the schedule such that the highest-priority modules (e.g., modules most likely to contain the largest plants, most fully-grown plants, and/or plants most ready for transfer) are moved to the robotic manipulator first, thereby yielding greater optical scan and transfer cycle efficiency at the robotic manipulator.

The system 100s and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for automating transfer of plants within an agricultural facility, the method comprising:
   receiving, at a transfer station within the agricultural facility:
   a first module defining a first array of plant slots at a first density and loaded with a first set of plants at a first growth stage;
   a second module defining a second array of plant slots at a second density less than the first density;
   for a plant in the first set of plants:
   recording a scan of the plant;
   calculating a viability parameter of the plant based on features detected in the scan; and
   in response to the viability parameter falling within a target viability range, triggering a robotic manipulator at the transfer station to transfer the plant from the first module into a plant slot in the second array of plant slots in the second module.

* * * * *